(12) United States Patent
Sugio et al.

(10) Patent No.: US 10,293,292 B2
(45) Date of Patent: May 21, 2019

(54) OIL SEPARATOR

(71) Applicant: NABTESCO AUTOMOTIVE CORPORATION, Tokyo (JP)

(72) Inventors: Takuya Sugio, Tokyo (JP); Ichiro Minato, Tokyo (JP); Hiroaki Kawanami, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 308 days.

(21) Appl. No.: 14/906,343

(22) PCT Filed: Jul. 23, 2014

(86) PCT No.: PCT/JP2014/069399
§ 371 (c)(1),
(2) Date: Jan. 20, 2016

(87) PCT Pub. No.: WO2015/012294
PCT Pub. Date: Jan. 29, 2015

(65) Prior Publication Data
US 2016/0158683 A1    Jun. 9, 2016

(30) Foreign Application Priority Data
Jul. 23, 2013   (JP) ................. 2013-152948

(51) Int. Cl.
*B01D 46/00* (2006.01)
*B60T 17/00* (2006.01)

(52) U.S. Cl.
CPC ..... *B01D 46/0031* (2013.01); *B01D 46/0005* (2013.01); *B60T 17/004* (2013.01)

(58) Field of Classification Search
USPC .................................................... 55/DIG. 42
See application file for complete search history.

(56) References Cited

U.S. PATENT DOCUMENTS

| 4,668,256 A | 5/1987 | Billiet et al. |
| 5,335,863 A | 8/1994 | Degrace |

(Continued)

FOREIGN PATENT DOCUMENTS

| JP | S61-181514 A | 8/1986 |
| JP | H07-204440 A | 8/1995 |

(Continued)

OTHER PUBLICATIONS

Machine translation of JP H07-204440 (Year: 1995).*

(Continued)

*Primary Examiner* — Robert Clemente
(74) *Attorney, Agent, or Firm* — Pillsbury Winthrop Shaw Pittman, LLP

(57) ABSTRACT

An oil separator causes air containing oil to strike an impingement member to separate the oil from the air and recover the oil. The oil separator includes a body having an inlet for introducing air and an outlet for discharging air. The oil separator further includes a cartridge that is assembled to the body and accommodates the impingement member. The oil separator further includes a drain bowl for storing the separated oil. The oil separator further includes an assembling structure. The body and the cartridge are assembled through one or two actions by using the assembling structure.

8 Claims, 20 Drawing Sheets

(56) References Cited

U.S. PATENT DOCUMENTS

2007/0084348 A1    4/2007   Hoffman et al.
2009/0230047 A1    9/2009   Treyz

FOREIGN PATENT DOCUMENTS

| JP | H08-510305 A | 10/1996 |
| JP | H10-296038 A | 11/1998 |
| JP | H11-169630 A | 6/1999 |
| JP | 2001-027159 A | 1/2001 |
| JP | 2002-085928 A | 3/2002 |
| JP | 2004-167295 A | 6/2004 |
| JP | 2005-147044 A | 6/2005 |
| JP | 2006-341143 A | 12/2006 |
| JP | 2009-222229 A | 10/2009 |

OTHER PUBLICATIONS

International Search Report as issued in International Patent Application No. PCT/JP2014/069399, dated Nov. 4, 2014.
International Preliminary Report on Patentability and the Written Opinion of the International Searching Authority as issued in International Patent Application No. PCT/JP2014/069399, dated Jan. 26, 2016.
Notification of Reasons for Refusal Japanese Patent Application No. 2015-528300 dated Aug. 1, 2018 with English translation.

\* cited by examiner

OIL SEPARATOR

CROSS-REFERENCE TO RELATED APPLICATIONS

This application is the U.S. National Stage of PCT/JP2014/069399, filed Jul. 23, 2014, which in turn claims priority to Japanese Patent Application No. JP 2013-152948, filed Jul. 23, 2013. The contents of these applications are incorporated herein by reference in their entireties.

TECHNICAL FIELD

The present invention relates to an oil separator that separates oil from air that has passed through equipment.

BACKGROUND ART

Vehicles such as trucks, buses, and construction machines utilize compressed air sent from a compressor, which is directly connected to an engine, to control systems such as brakes and suspensions. The compressed air contains water, which is contained in the atmosphere, and oil for lubricating the inside of the compressor. When the compressed air containing such water and oil enters inside the systems, it causes rust and swelling of rubber members (such as O-rings) and results in an operational defect. Thus, an air dryer is provided downstream of the compressor in a pneumatic system for removing water and oil from the compressed air (for example, Patent Document 1).

A filter and a desiccant such as silica gel and zeolite are provided in the air dryer. The air dryer performs dehumidification to remove water from compressed air and regeneration to regenerate the desiccant by removing the water adsorbed by the desiccant and discharging it to the outside.

PRIOR ART DOCUMENTS

Patent Documents

Patent Document 1: Japanese Laid-Open Patent Publication No. 10-296038

SUMMARY OF THE INVENTION

Problems that the Invention is to Solve

The air discharged from the air dryer during regeneration of the desiccant contains oil together with water. Considering the burden on the environment, an oil separator may be provided downstream from the compressor in the air system. An oil separator has an impingement member in the housing and performs gas/liquid separation by causing air that contains water and oil to strike the impingement member to recover the oil from the air and discharge cleaned air. The impingement member of the oil separator needs to be replaced periodically.

An oil separator conceived by the present inventors includes a body, to which an introduction pipe and a discharge pipe are connected, and a case, which accommodates an impingement member. The case is fixed to the body with bolts. When replacing the impingement member, all the bolts must be removed, which complicates the operation. Thus, there is a demand for an oil separator that allows the case accommodating an impingement member to be easily attached to or detached from the body.

Accordingly, it is an objective of the present invention to provide an oil separator that allows a case accommodating an impingement member to be easily attached to or detached from a body.

Means for Solving the Problems

Means for achieving the above objectives and advantages thereof will now be discussed.

To achieve the foregoing objective, an oil separator is provided that causes air containing oil to strike an impingement member to separate the oil from the air and recover the oil. The oil separator includes a body having an inlet for introducing air and an outlet for discharging air, a cartridge that is assembled to the body and accommodates the impingement member, a drain bowl for storing the separated oil, and an assembling structure. The body and the cartridge are assembled through one or two actions by using the assembling structure.

With this configuration, the body and the cartridge are assembled through one or two actions by using the assembling structure. This allows the cartridge, which is a case accommodating the impingement member, to be easily attached to or detached from the body.

In the above described oil separator, a first thread portion is preferably formed in the body, and a second thread portion is preferably formed in the cartridge. Also, the assembling structure is preferably a spin-on structure in which the first thread portion and the second thread portion are threaded to each other.

With this configuration, the body and the cartridge are assembled by using the spin-on structure. Since the cartridge is threaded to the body, the cartridge, which is a case accommodating the impingement member, is easily attached to or detached from the body.

In the above described oil separator, a first central passage portion, which allows air to pass through, is preferably provided in a radially central part of the body, and the first thread portion is preferably formed in the first central passage portion. Also, a second central passage portion, which allows air to pass through, is preferably provided in a radially central part of the cartridge, and the second thread portion is preferably formed in the second central passage portion.

With this configuration, the first thread portion and the second thread portion are formed in the first central passage portion and the second central passage portion, which are provided in radially central parts of the body and the cartridge, respectively. This allows thread portions of small diameters to be employed, facilitating alignment of the body and the cartridge with each other. Accordingly, the assembling operation is facilitated.

In the above described oil separator, the first thread portion is preferably an external thread, and the second thread portion is preferably an internal thread.

With this configuration, the body has an external thread portion, and the cartridge has an internal thread portion. It is therefore only necessary to align the internal thread portion of the cartridge with the external thread portion projecting from the body. The fixed body is therefore prevented from being scratched.

In the above described oil separator, an insertion portion is preferably provided in one of the body and the cartridge, and an attachment portion is provided in the other one of the body and the cartridge. Also, the assembling structure is preferably a one-touch coupler structure, in which the insertion portion is attached to the attachment portion. When the insertion portion is attached to the attachment portion, the insertion portion is preferably restricted from being removed from the attachment portion.

With this configuration, the body and the cartridge are assembled by using the one-touch coupler structure. Since the insertion portion is threaded to the attachment portion, the cartridge, which is a case accommodating the impingement member, is easily attached to or detached from the body.

In the above described oil separator, the body preferably has an opening, and the cartridge preferably has an opening. The assembling structure is preferably a band fastener structure in which the opening of the body is brought into contact with the opening of the cartridge, and the body and the cartridge are fixed to each other with a band at the contacting parts.

With this configuration, the body and the cartridge are assembled by using the band fastener structure. Since the band is fixed to the contacting parts, the cartridge, which is a case accommodating the impingement member, is easily attached to or detached from the body.

In the above described oil separator, the cartridge and the drain bowl are preferably assembled by using the assembling structure.

With this configuration, the drain bowl and the cartridge are assembled by using the assembling structure. The assembling structure of the drain bowl and the cartridge allows the drain bowl to be easily attached to or detached from the cartridge.

In the above described oil separator, a third thread portion is preferably formed in the cartridge, and a fourth thread portion is preferably formed in the drain bowl. The assembling structure is preferably a spin-on structure in which the third thread portion and the fourth thread portion are threaded to each other.

With this configuration, the cartridge and the drain bowl are assembled by using the spin-on structure. Since the drain bowl is threaded to the cartridge, the drain bowl is easily attached to or detached from the cartridge.

In the above described oil separator, the body and the drain bowl preferably are assembled by using the assembling structure.

With this configuration, the body and the drain bowl are assembled by using the assembling structure. The assembling structure of the body and the drain bowl allows the drain bowl to be easily attached to or detached from the body.

In the above described oil separator, a fifth thread portion is preferably formed in the body, and a sixth thread portion is preferably formed in the drain bowl. The assembling structure is preferably a spin-on structure in which the fifth thread portion and the sixth thread portion are threaded to each other.

With this configuration, the cartridge and the drain bowl are assembled by using the spin-on structure. Since the drain bowl is threaded to the body, the drain bowl is easily attached to or detached from the body.

In the above described oil separator, the body preferably includes a connecting member that has a lower opening, the inlet, and the outlet, and a lid member that closes the opening of the connecting member and has the first thread portion.

With this configuration, the body includes two members, which are the connecting member and the lid member. This facilitates the molding of the body.

In the above described oil separator, the body preferably has an expansion chamber for expanding air.

With this configuration, the body includes the expansion chamber. Thus, the air that has flowed into the body is expanded in the expansion chamber, allowing oil in the air to readily strike the impingement member.

Effects of the Invention

The present invention allows a case accommodating an impingement member to be easily attached to and detached from a body.

MODES FOR CARRYING OUT THE INVENTION

First Embodiment

Figure 1:
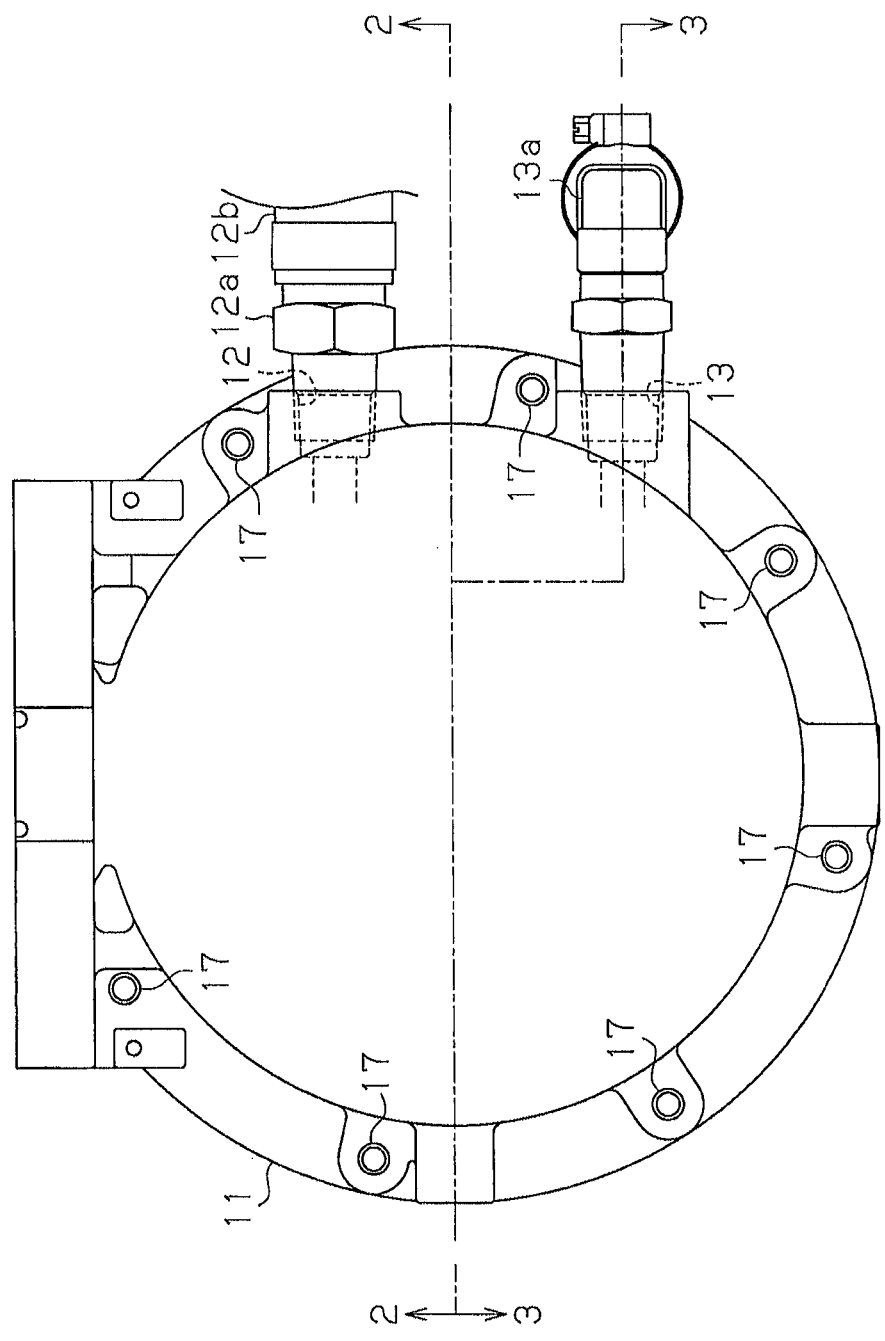
FIG. 1 is a top view of an oil separator according to a first embodiment.

An oil separator according to a first embodiment will now be described with reference to FIGS. 1 to 4. FIG. 3 is a cross-sectional view taken along line 3-3 of FIG. 1, illustrating a body 10, a filter cartridge 20, and a drain bowl 30. The other components are shown as viewed in a direction opposite to the direction of line 2-2 in FIG. 1.

Figure 2:
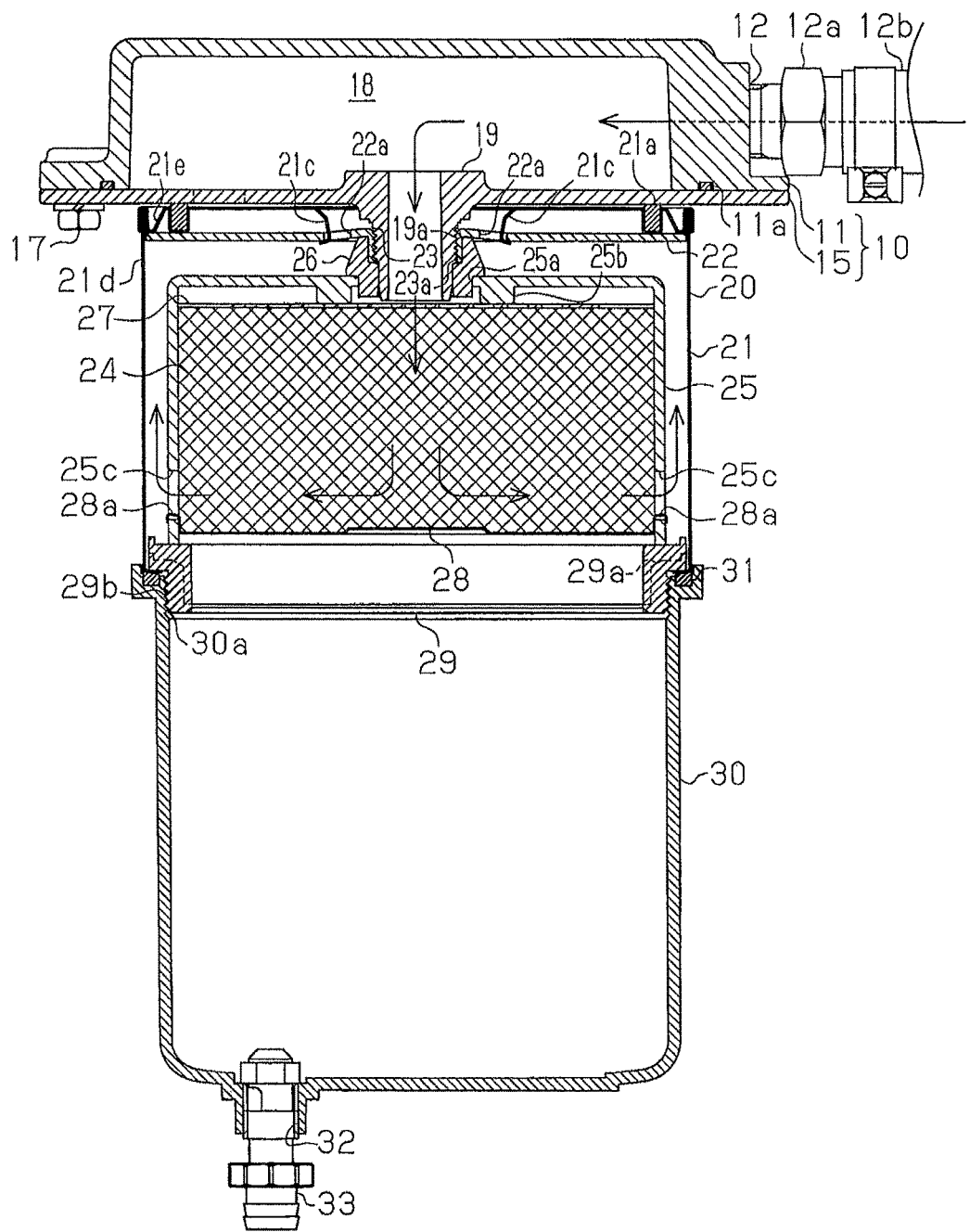
FIG. 2 is a cross-sectional view taken along line 2-2 of FIG. 1, illustrating the structure of the oil separator and flow of air on the introduction side.
Figure 3:
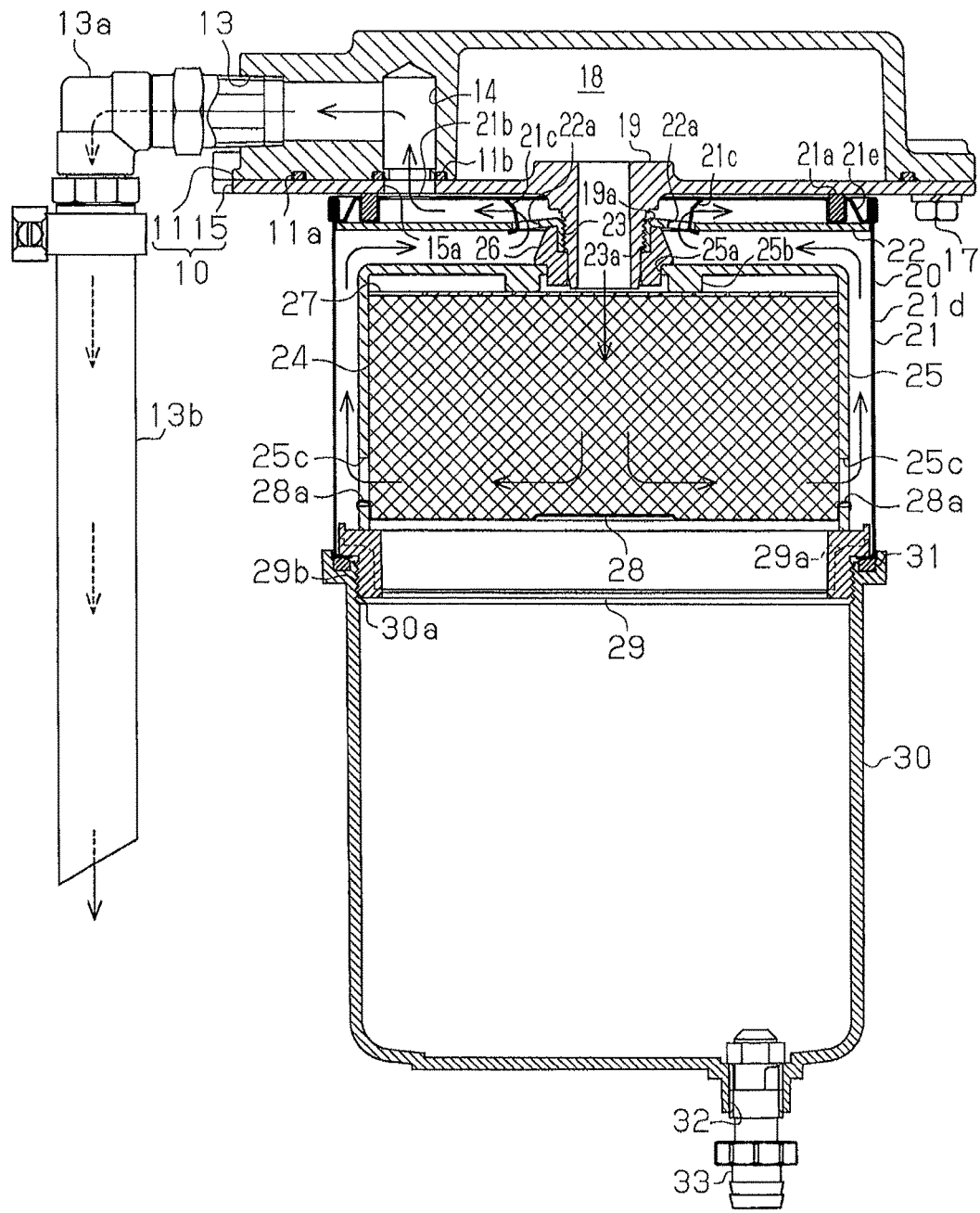
FIG. 3 is a cross-sectional view taken along line 3-3 of FIG. 1, illustrating the structure of the oil separator and flow of air on the discharge side.

As shown in FIGS. 2 and 3, the oil separator has a vertically extending cylindrical housing. The oil separator includes the body 10, the filter cartridge 20, which is assembled to the bottom of the body 10, and the drain bowl 30, which is assembled to the bottom of the filter cartridge 20. The body 10 has a first port 12, which is an inlet for introducing compressed air from an air dryer, and a second port 13, which is an outlet for discharging air. The filter cartridge 20 accommodates a filter 24, which is made of sponge (urethane foam). The drain bowl 30 stores oil separated from air. The filter 24 functions as an impingement member.

The body 10 includes a connecting member 11, which has a lower opening and a closed upper end, and a disk-shaped lid member 15, which closes the opening of the connecting member 11. The connecting member 11 and the lid member 15 are fixed to each other with bolts 17.

The first port 12 and the second port 13 are formed in the connecting member 11. An introduction-side coupling member 12a is threaded to the first port 12. An introduction hose 12b connected to the air dryer is assembled to the introduction-side coupling member 12a. A discharge-side coupling member 13a is threaded to the second port 13. A discharge hose 13b is assembled to the discharge-side coupling member 13a. An annular first sealing member 11a is provided in a lower part of the connecting member 11. The first sealing member 11a seals between the connecting member 11 and the lid member 15. The second port 13 of the connecting member 11 has a communication passage 14, which communicates with the filter cartridge 20 via the lid member 15. An annular second sealing member 11b is provided about the inlet of the communication passage 14 at the lower part of the connecting member 11.

The lid member 15 has a first central passage portion 19, which allows air to pass through, at the radially central part. The first central passage portion 19 projects downward from the lid member 15. A first thread portion 19a, which is an external thread, is formed in the first central passage portion 19. The connecting member 11 and the lid member 15 define a space in the body 10, and the space functions as a first expansion chamber 18. The lid member 15 has a through hole 15a, which connects the second port 13 and the filter cartridge 20 with each other.

The filter cartridge 20 includes a case 21, which has a lower opening and a closed upper end, a thread member 22, which is supported by the case 21 and threaded to the lid member 15, a filter accommodating member 25, which accommodates the filter 24, and a filter supporting member 29, which supports the filter accommodating member 25. The filter accommodating member 25 has a punched metal sheet 27, in which multiple through holes are formed, and a filter supporting plate 28, which supports the filter 24.

An annular third sealing member 21a is provided in an upper part of the case 21. The case 21 has, in the upper part, a through hole 21b, which is aligned with the through hole 15a of the lid member 15. The thread member 22 has a second central passage portion 23, which allows air to pass through, at the radially central part. The second central passage portion 23 projects downward from the thread member 22. A second thread portion 23a, which is an internal thread, is formed in the second central passage portion 23. Through holes 22a, which extend between the upper and lower faces of the thread member 22, are formed about the second central passage portion 23. Engaging pieces 21c are provided in an upper part of the case 21. The engaging pieces 21c engage with the through hole 15a of the thread member 22 to secure the thread member 22. The thread member 22 is supported by the engaging pieces 21c of the case 21. The joint of a side surface portion 21d and a top surface portion 21e is sealed by tucking the edge of the side surface portion 21d together with the edge of the top surface portion 21e.

The filter accommodating member 25 has a cylindrical shape with an open lower end and a closed upper end. The filter accommodating member 25 has a center through hole 25a at the center in an upper part. The center through hole 25a receives the first central passage portion 19 of the lid member 15. An annular protrusion 25b is formed on the lower surface of the filter accommodating member 25 at a position below the part surrounding the center through hole 25a. The protrusion 25b of the filter accommodating member 25 forms a space between the inner surface of the filter accommodating member 25 and the filter 24. A cylindrical fourth sealing member 26 is arranged between the second central passage portion 23 of the thread member 22 and the center through hole 25a of the filter accommodating member 25. The fourth sealing member 26 seals between the second central passage portion 23 of the thread member 22 and the center through hole 25a of the filter accommodating member 25.

The filter accommodating member 25 has side through holes 25c in a lower part of the side. The filter supporting plate 28 has engaging pieces 28a at the outer edge. The engaging pieces 28a are engaged with the side through holes 25c of the filter accommodating member 25. The filter supporting plate 28 supports the filter 24 in the filter accommodating member 25 by engaging the engaging pieces 28a with the filter accommodating member 25.

While being supported by the lower end of the case 21, the filter supporting member 29 supports the filter accommodating member 25. The filter supporting member 29 has a groove 29a. Liquid that has been separated from air and contains oil and water passes through the groove 29a of the filter accommodating member 25. A third thread portion 29b, which is an external thread, is formed in the filter supporting member 29.

The drain bowl 30 has a cylindrical shape with an upper opening and a closed lower end. An annular fifth sealing member 31 is provided in the upper end of the drain bowl 30. The fifth sealing member 31 seals between the case 21 and the drain bowl 30. A fourth thread portion 30a, which is an internal thread, is formed in the drain bowl 30. The drain bowl 30 has, at a lower part, a drainage hole 32 for draining stored liquid. A connection plug 33, to which a drain hose is connected, is assembled to the drainage hole 32.

Figure 4:
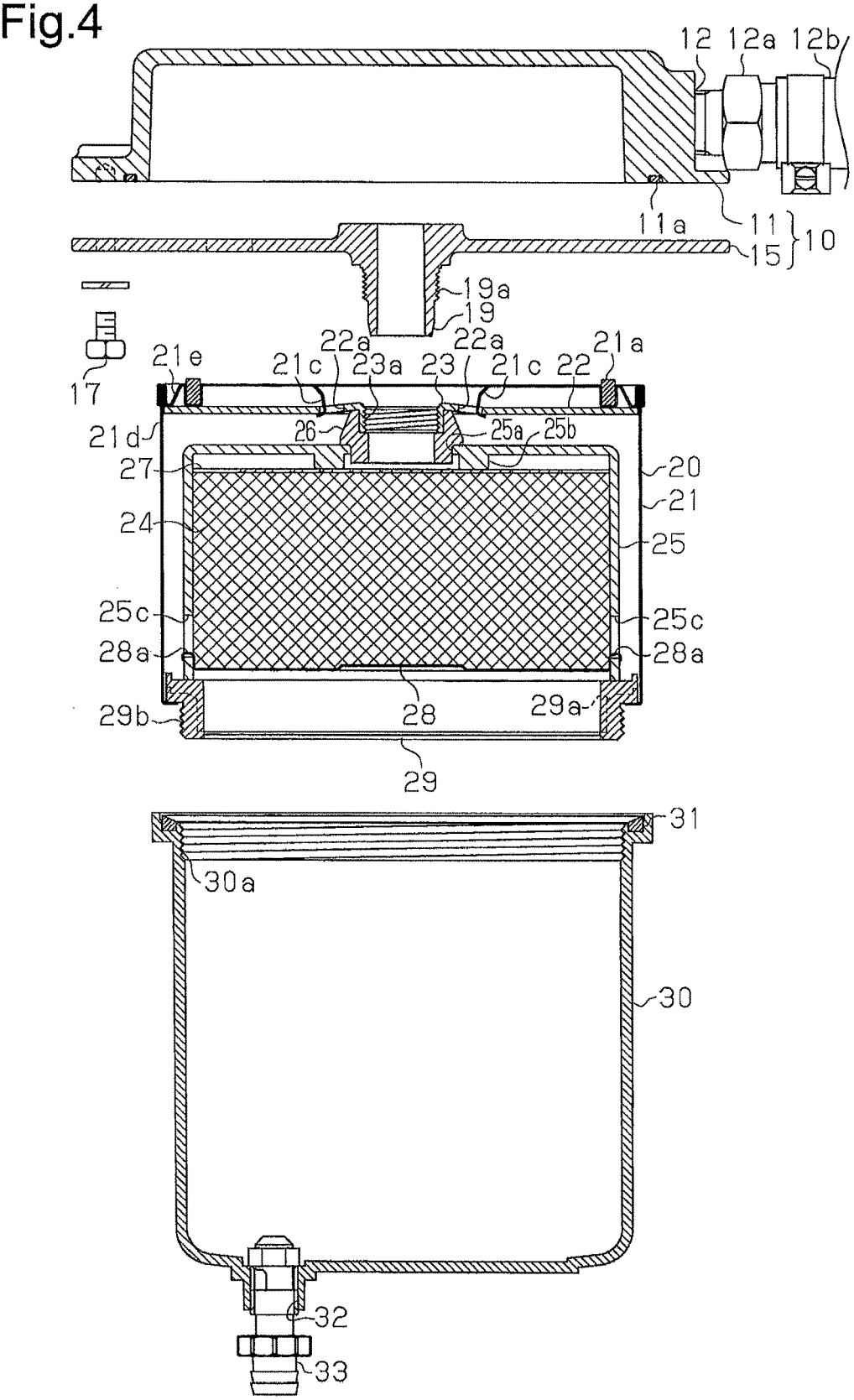
FIG. 4 is an exploded cross-sectional view of the oil separator of FIG. 1.

The assembling process of the oil separator will now be described with reference to FIG. 4.

First, the assembling process of the body 10 will be described.

With the first sealing member 11a placed in the lower part of the connecting member 11, the lid member 15 is fastened to the connecting member 11 with the bolts 17.

Next, the assembling process of the filter cartridge 20 will be described.

The thread member 22 is inserted into the case 21 so that the engaging pieces 21c of the case 21 pass through the through holes 22a of the thread member 22. The engaging pieces 21c are then bent to engage with the through holes 22a of the thread member 22. The fourth sealing member 26 is attached to the second central passage portion 23 of the thread member 22.

The punched metal sheet 27 is inserted into the filter accommodating member 25. The filter 24 is then inserted so that the filter supporting plate 28 covers the filter 24. Subsequently, the engaging pieces 28a of the filter supporting plate 28 are passed through the side through holes 25c of the filter accommodating member 25. The engaging pieces 28a are bent to engage with the side through holes 25c of the filter accommodating member 25.

The filter accommodating member 25 is inserted into the case 21, and the fourth sealing member 26 is attached to the center through hole 25a of the filter accommodating member 25. Subsequently, the filter supporting member 29 is brought into contact with the filter accommodating member 25, and the lower end of the case 21 is bent toward the filter supporting member 29 to secure the filter supporting member 29.

Next, the assembling process of the body 10, the filter cartridge 20, and the drain bowl 30 will be described.

First, the filter cartridge 20 and the drain bowl 30 are assembled by using a spin-on structure, in which the third thread portion 29b formed in the filter cartridge 20 and the fourth thread portion 30a formed in the drain bowl 30 are threaded to each other. Then, the body 10 and the filter cartridge 20 are assembled by using a spin-on structure, in which the first thread portion 19a formed in the body 10 and the second thread portion 23a formed in the filter cartridge 20 are threaded to each other. The spin-on structure completes the assembling process in one action and corresponds to an assembling structure.

When replacing the filter 24, the filter cartridge 20, to which the drain bowl 30 is assembled, is removed from the body 10. The filter cartridge 20 is removed from the drain bowl 30, and a new filter cartridge 20 is assembled to the drain bowl 30, so that the filter cartridge 20, that is, the filter 24 is replaced. After the filter cartridge 20 is replaced, the filter cartridge 20, to which the drain bowl 30 is assembled, is assembled to the body 10.

Operation of the above described oil separator will now be described with reference to FIGS. 2 and 3.

Passage of air on the introduction side will first be described with reference to FIG. 2. Purge air discharged from the air dryer is introduced to the first port 12 of the oil separator. The purge air contains oil and water. The purge air introduced through the first port 12 is introduced to the body 10 and is expanded in the first expansion chamber 18.

The air expanded in the first expansion chamber 18 passes through the first central passage portion 19 of the lid member 15 from the top to the bottom and enters the filter accommodating member 25. The air that has entered the filter accommodating member 25 strikes the filter 24 after striking the punched metal sheet 27, so that oil and water contained in the air are separated from the air. Liquid containing water and oil trapped by the punched metal sheet 27 and the filter 24 flows along the filter 24 and drops downward through the clearance between the filter supporting plate 28 and the filter accommodating member 25. The liquid is thus stored in the drain bowl 30.

Passage of air on the discharge side will be described with reference to FIG. 3. The air that has passed through the filter 24 is introduced to the clearance between the case 21 and the filter accommodating member 25 from the side through holes 25c of the filter accommodating member 25. The air that has passed through the through holes 22a of the thread member 22 enters the clearance between the thread member 22 and the case 21. The air that has entered the clearance between the thread member 22 and the case 21 passes through the through hole 21b of the case 21, the through hole 15a of the lid member 15, and the communication passage 14 and is discharged to the outside from the second port 13 via the discharge hose 13b.

The above described first embodiment has the following advantages.

(1) The body 10 and the filter cartridge 20 are assembled by using the spin-on structure, in which the first thread portion 19a formed in the body 10 and the second thread portion 23a formed in the filter cartridge 20 are threaded to each other. Since the filter cartridge 20 is threaded to the body 10, the filter cartridge 20, which is the case 21 accommodating the filter 24, is easily attached to or detached from the body 10.

(2) The first thread portion 19a and the second thread portion 23a are formed in the first central passage portion 19 and the second central passage portion 23, which are provided in radially central parts of the body 10 and the filter cartridge 20, respectively. This allows thread portions of small diameters to be employed, facilitating alignment of the body 10 and the filter cartridge 20 with each other. Accordingly, the assembling operation is facilitated.

(3) The first thread portion 19a of the body 10 is an external thread, and the second thread portion 23a of the filter cartridge 20 is an internal thread. It is therefore only necessary to align the internal thread portion of the filter cartridge 20 with the external thread portion projecting from the body 10. The fixed body 10 is therefore prevented from being scratched.

(4) The filter cartridge 20 and the drain bowl 30 are assembled by using the spin-on structure, in which the third thread portion 29b formed in the filter cartridge 20 and the fourth thread portion 30a formed in the drain bowl 30 are threaded to each other. Since the drain bowl 30 is threaded to the filter cartridge 20, the drain bowl 30 is easily attached to or detached from the body 10.

(5) The body 10 includes two members, which are the connecting member 11 and the lid member 15. This facilitates the molding of the body 10.

(6) The body 10 has the first expansion chamber 18. The air that has flowed into the body 10 is expanded in the expansion chamber 18, allowing oil in the air to readily strike the filter 24.

Second Embodiment

An oil separator according to a second embodiment will now be described with reference to FIGS. 5 and 6. The oil separator of the second embodiment is different from that of the first embodiment in that air flows in a direction opposite to that of the first embodiment. Differences from the first embodiment will mainly be discussed below. The filter cartridge 20 and the drain bowl 30 of the oil separator of the second embodiment have the same configuration as that of the oil separator of the first embodiment.

Figure 5:
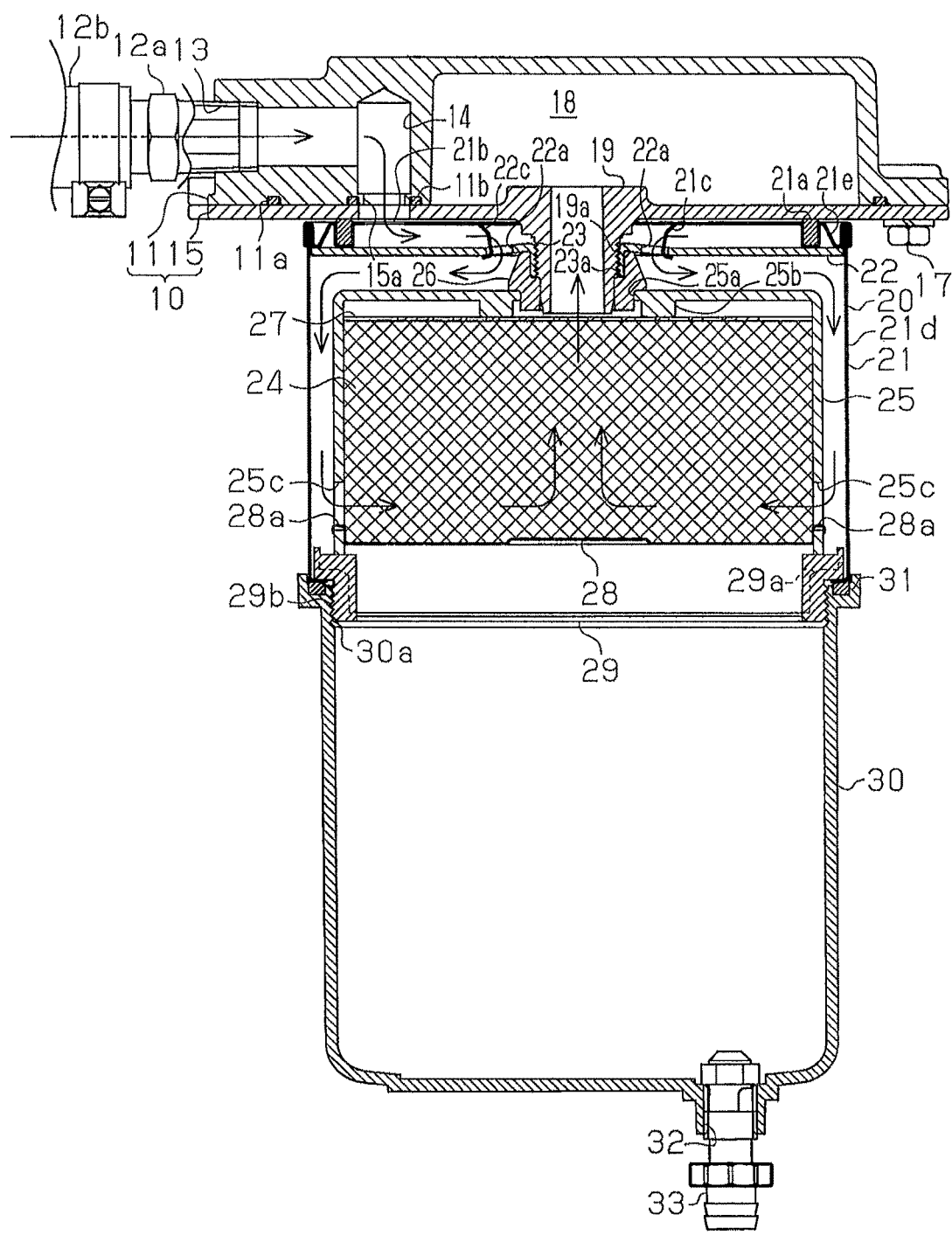
FIG. 5 is a cross-sectional view illustrating the structure of an oil separator according to a second embodiment and flow of air on the introduction side.
Figure 6:
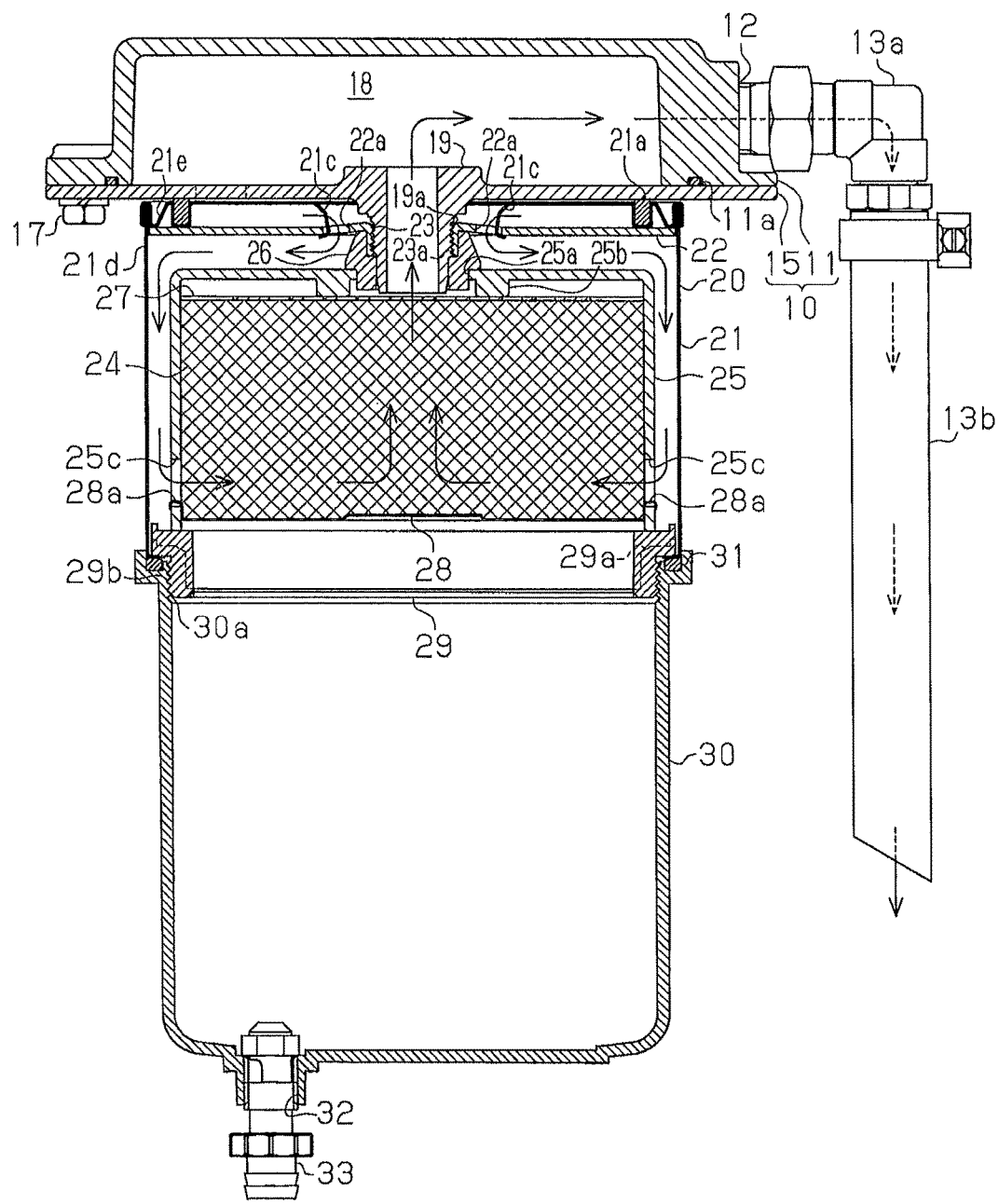
FIG. 6 is a cross-sectional view illustrating the structure of the oil separator of FIG. 5 and flow of air on the discharge side.

As shown in FIGS. 5 and 6, the second port 13 serves as the inlet, and the first port 12 serves as the outlet. The introduction hose 12b is connected to the second port 13 via the introduction-side coupling member 12a. The discharge hose 13b is connected to the first port 12 via the discharge-side coupling member 13a.

Operation of the above described oil separator will now be described with reference to FIGS. 5 and 6.

Passage of air on the introduction side will first be described with reference to FIG. 5. Purge air discharged from the air dryer is introduced to the second port 13 of the oil separator. The purge air contains oil and water. The purge air introduced through the second port 13 enters the filter cartridge 20 after passing through the communication passage 14, the through hole 15a of the lid member, and the through hole 21b of the case 21.

The air that has entered the clearance between the case 21 and the thread member 22 passes through the through holes 22a of the thread member 22 and then enters the filter accommodating member 25 from the side through holes 25c of the filter accommodating member 25. The air strikes the punched metal sheet 27 and the filter 24, so that oil and water contained in the air are separated from the air. Liquid containing water and oil trapped by the punched metal sheet 27 and the filter 24 flows along the filter 24 and drops downward through the clearance between the filter supporting plate 28 and the filter accommodating member 25. The liquid is thus stored in the drain bowl 30.

Passage of air on the discharge side will be described with reference to FIG. 6. The air that has passed through the filter 24 passes through the first central passage portion 19 of the lid member 15 from the bottom to the top and is expanded in the first expansion chamber 18. The air expanded in the first expansion chamber 18 is discharged to the outside from the first port 12 via the discharge hose 13b.

The second embodiment has the advantages (1) to (5) of the first embodiment.

Third Embodiment

An oil separator according to a third embodiment will now be described with reference to FIGS. 7 and 8. The oil separator of the third embodiment is different from that of the first embodiment in that the first port communicates with the central passage portion. Differences from the first embodiment will mainly be discussed below. The filter cartridge 20 and the drain bowl 30 of the oil separator of the third embodiment have substantially the same configuration as that of the oil separator of the first embodiment.

Figure 7:
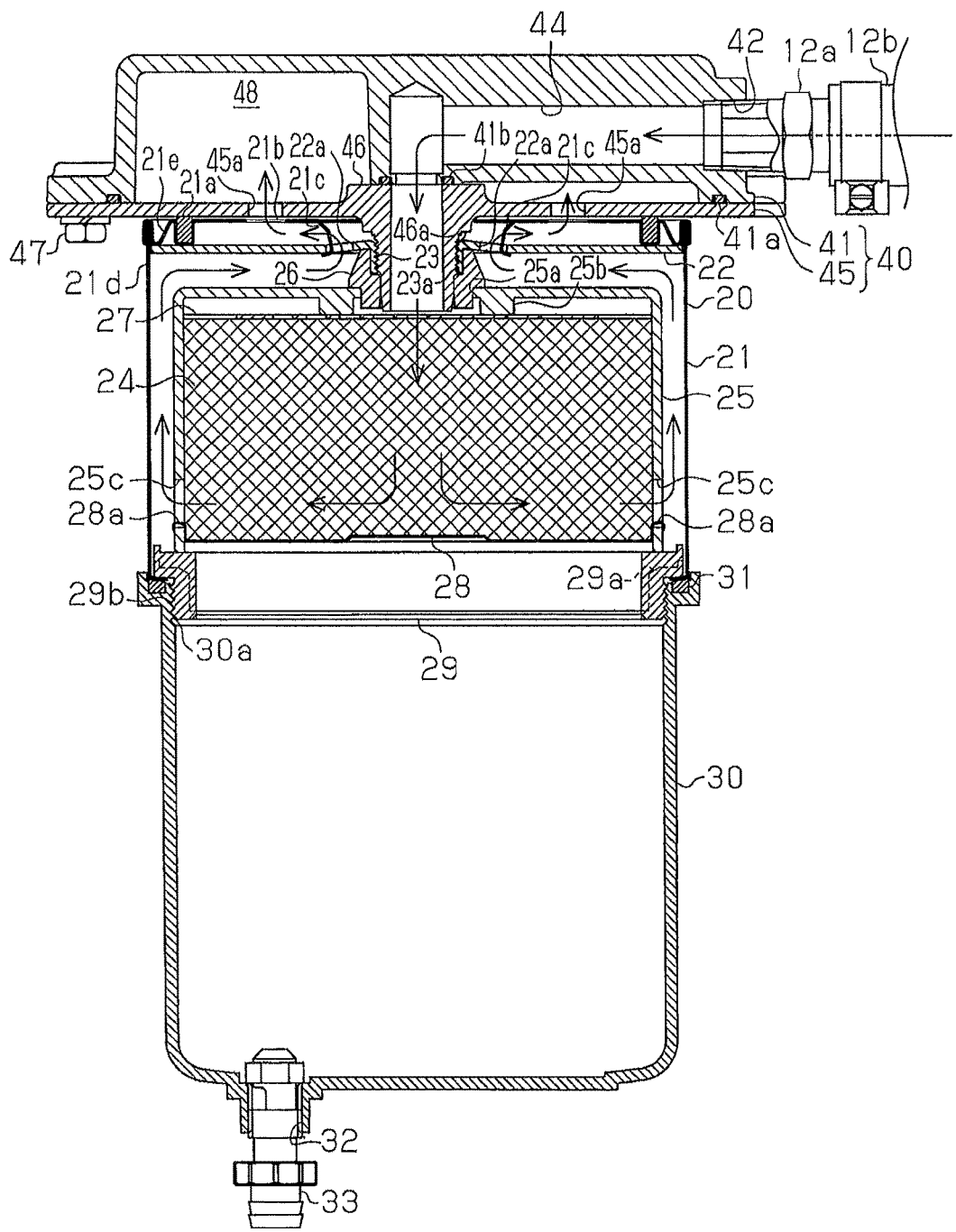
FIG. 7 is a cross-sectional view illustrating the structure of an oil separator according to a third embodiment and flow of air on the introduction side.
Figure 8:
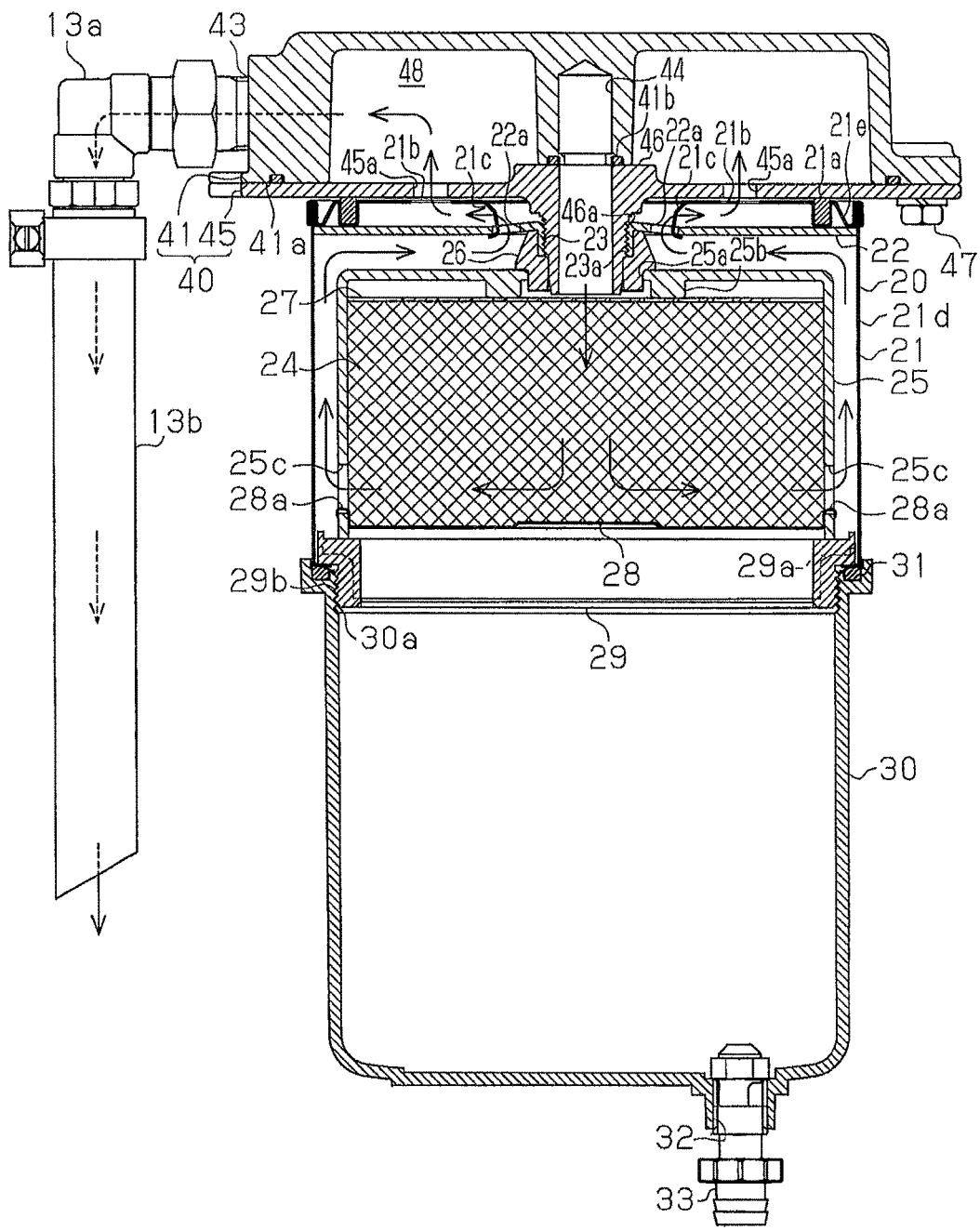
FIG. 8 is a cross-sectional view illustrating the structure of the oil separator of FIG. 7 and flow of air on the discharge side.

As shown in FIGS. 7 and 8, a body 40 has a first port 42, which is an inlet for introducing compressed air from an air dryer, and a second port 43, which is an outlet for discharging air. The body 40 includes a connecting member 41, which has a lower opening and a closed upper end, and a disk-shaped lid member 45, which closes the opening of the connecting member 41. The connecting member 41 and the lid member 45 are fixed to each other with bolts 47.

The first port 42 and the second port 43 are formed in the connecting member 41. An introduction-side coupling member 12a is threaded to the first port 42. An introduction hose 12b connected to the air dryer is assembled to the introduction-side coupling member 12a. A discharge-side coupling member 13a is threaded to the second port 43. A discharge hose 13b is assembled to the discharge-side coupling member 13a. An annular first sealing member 41a is provided in a lower part of the connecting member 41. The first sealing member 41a seals between the connecting member 41 and the lid member 45. The connecting member 41 has a communication passage 44, which communicates with the filter cartridge 20 via the lid member 45. An annular second sealing member 41b is provided about the inlet of the communication passage 44 at the lower part of the connecting member 41.

The lid member 45 has a first central passage portion 46, which allows air to pass through, at the radially central part. The first central passage portion 46 projects downward from the lid member 45. The communication passage 44 connects the first port 42 of the connecting member 41 to the first central passage portion 46. A first thread portion 46a, which is an external thread, is formed in the first central passage portion 46. The connecting member 41 and the lid member 45 define a space in the body 40, and the space functions as a first expansion chamber 48. The lid member 45 has a through hole 45a, which connects the first expansion chamber 48 and the filter cartridge 20 with each other.

Operation of the above described oil separator will now be described with reference to FIGS. 7 and 8.

Passage of air on the introduction side will first be described with reference to FIG. 7. Purge air discharged from the air dryer is introduced to the first port 42 of the oil separator. The purge air contains oil and water. The purge air introduced from the first port 42 passes through the communication passage 44, passes the first central passage portion 46 of the lid member 45 from the top to the bottom, and enters the filter accommodating member 25.

The air that has entered the filter accommodating member 25 strikes the filter 24 after striking the punched metal sheet 27, so that oil and water contained in the air are separated from the air. Liquid containing water and oil trapped by the punched metal sheet 27 and the filter 24 flows along the filter 24 and drops downward through the clearance between the filter supporting plate 28 and the filter accommodating member 25. The liquid is thus stored in the drain bowl 30.

Passage of air on the discharge side will be described with reference to FIG. 8. The air that has passed through the filter 24 is introduced to the clearance between the case 21 and the filter accommodating member 25 from the side through holes 25c of the filter accommodating member 25. The air that has passed through the through holes 22a of the thread member 22 enters the clearance between the thread member 22 and the case 21. The air passes through the through hole 21b of the case 21, the through hole 45a of the lid member 45, and the communication passage 44 and is discharged to the outside from the second port 43 via the discharge hose 13b.

The third embodiment has the advantages (1) to (5) of the first embodiment.

Fourth Embodiment

An oil separator according to a fourth embodiment will now be described with reference to FIGS. 9 and 10. The oil separator of the fourth embodiment is different from that of the third embodiment in that air flows in a direction opposite to that of the third embodiment. Differences from the third embodiment will mainly be discussed below. The filter cartridge 20 and the drain bowl 30 of the oil separator of the fourth embodiment have substantially the same configuration as that of the oil separator of the first embodiment.

Figure 9:
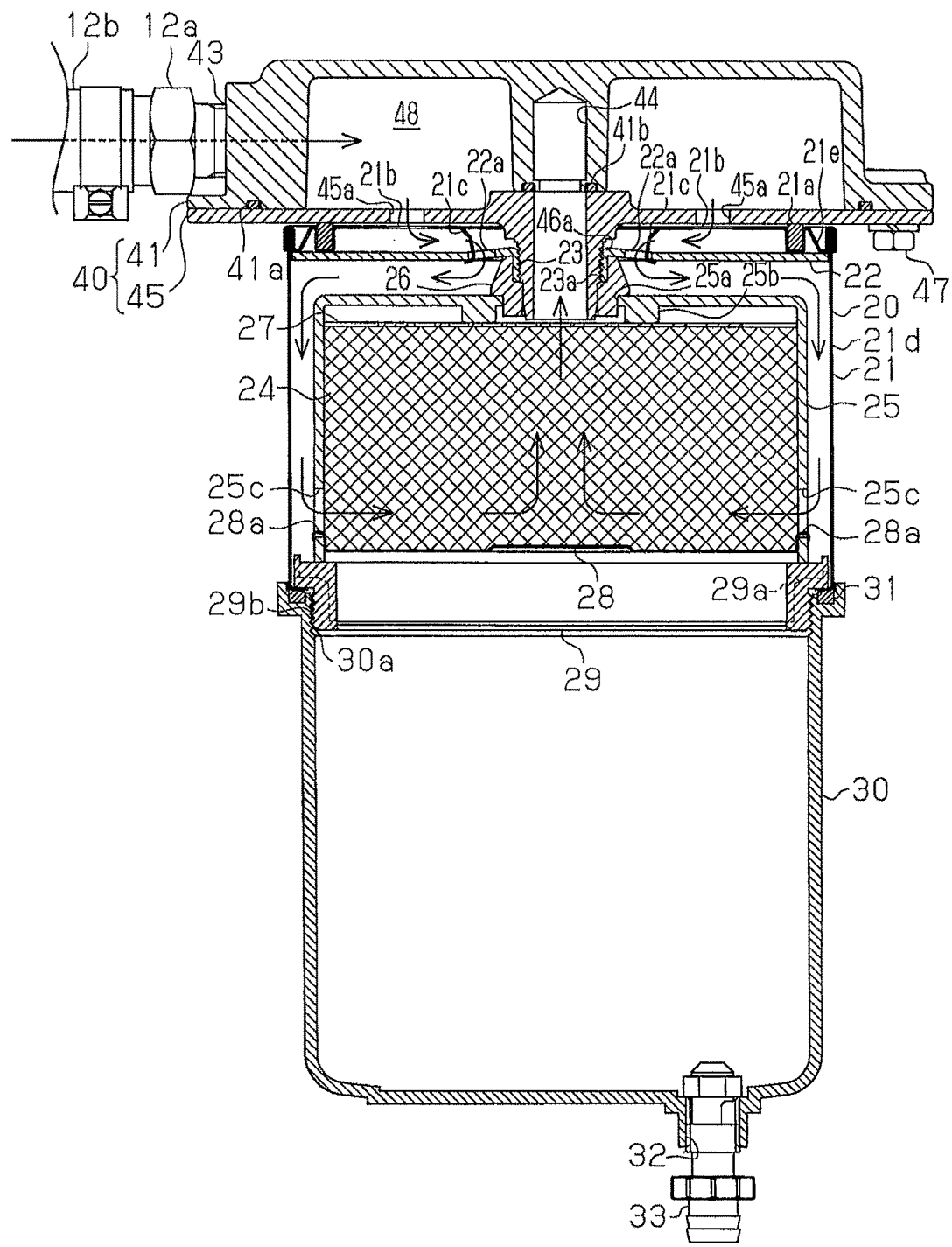
FIG. 9 is a cross-sectional view illustrating the structure of an oil separator according to a fourth embodiment and flow of air on the introduction side.
Figure 10:
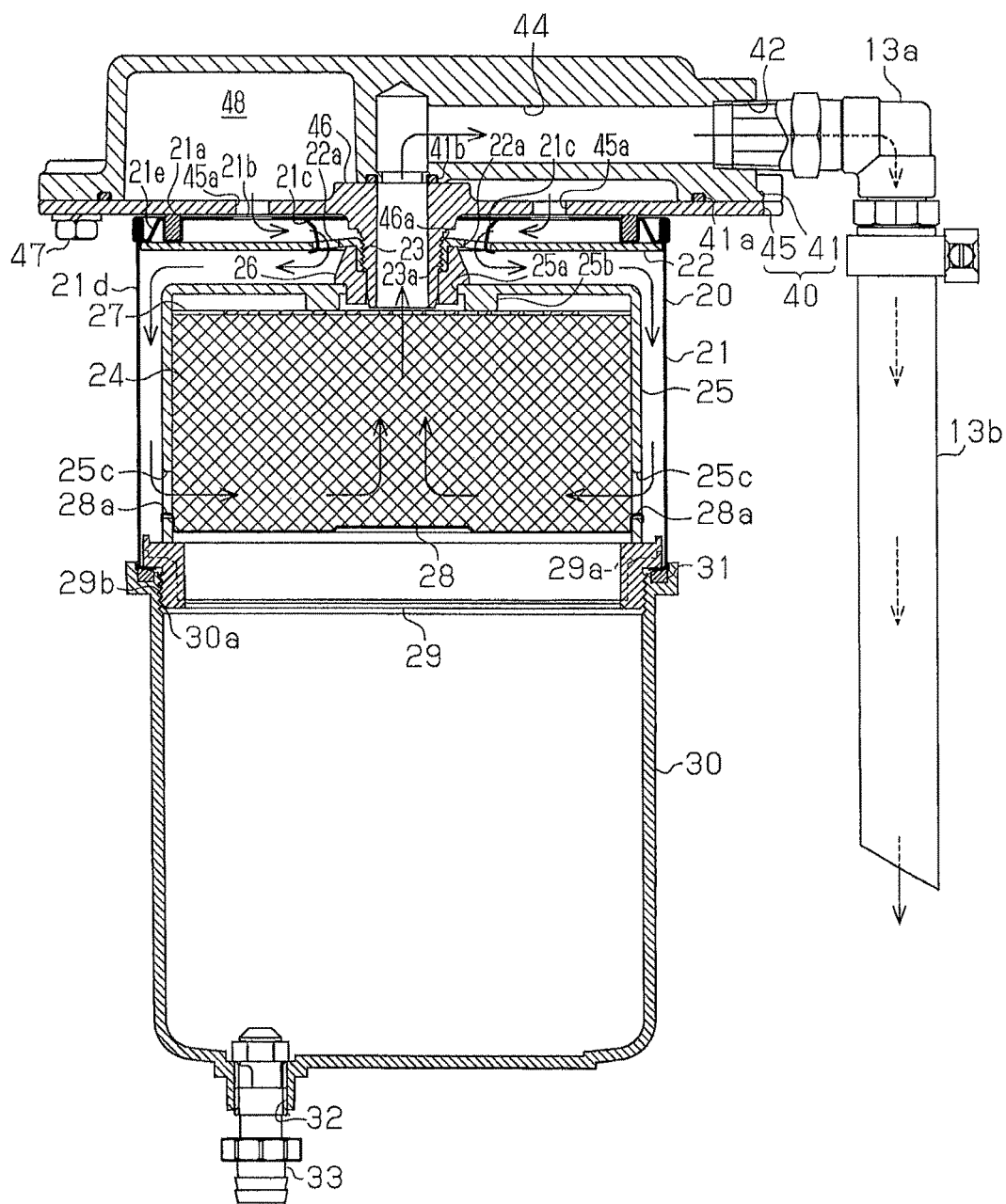
FIG. 10 is a cross-sectional view illustrating the structure of the oil separator of FIG. 9 and flow of air on the discharge side.

As shown in FIGS. 9 and 10, the second port 43 serves as the inlet, and the first port 42 serves as the outlet. The introduction hose 12b is connected to the second port 43 via the introduction-side coupling member 12a. The discharge hose 13b is connected to the first port 42 via the discharge-side coupling member 13a.

Operation of the above described oil separator will now be described with reference to FIGS. 9 and 10.

Passage of air on the introduction side will first be described with reference to FIG. 9. Purge air discharged from the air dryer is introduced to the second port 43 of the oil separator. The purge air contains oil and water. The purge air introduced through the second port 43 is introduced to the body 40 and is expanded in the first expansion chamber 48.

The air expanded in the first expansion chamber 48 enters the filter cartridge 20 after passing through the through hole 45*a* of the lid member 45 and the through hole 21*b* of the case 21. The air that has entered the clearance between the case 21 and the thread member 22 passes through the through holes 22*a* of the thread member 22 and then enters the filter accommodating member 25 from the side through holes 25*c* of the filter accommodating member 25. The air strikes the filter 24 and the punched metal sheet 27, so that oil and water contained in the air are separated from the air. Liquid containing water and oil trapped by the filter 24 and the punched metal sheet 27 flows along the filter 24 and drops downward through the clearance between the filter supporting plate 28 and the filter accommodating member 25. The liquid is thus stored in the drain bowl 30.

Passage of air on the discharge side will be described with reference to FIG. 10. After passing through the filter 24, the air passes through the first central passage portion 46 from the bottom to the top and passes through the communication passage 44. Then, the air is discharged to the outside from the first port 42 via the discharge hose 13*b*.

The fourth embodiment has the advantages (1) to (6) of the first embodiment.

Fifth Embodiment

An oil separator according to a fifth embodiment will now be described with reference to FIGS. 11 and 12. The oil separator of the fifth embodiment is different from that of the first embodiment in that the body is molded integrally. Differences from the first embodiment will mainly be discussed below. The filter cartridge 20 and the drain bowl 30 of the oil separator of the fifth embodiment have substantially the same configuration as that of the oil separator of the first embodiment.

Figure 11:
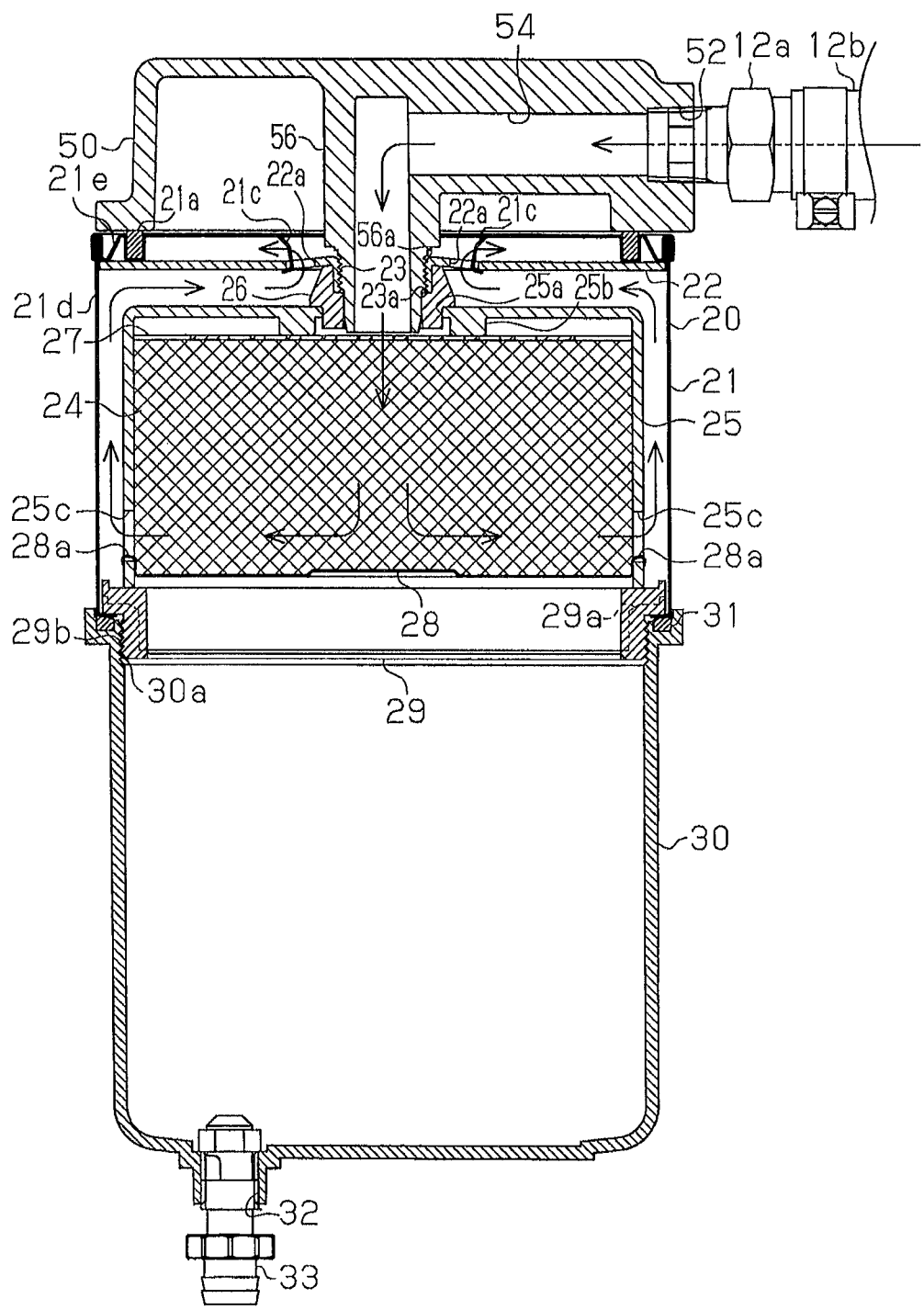
FIG. 11 is a cross-sectional view illustrating the structure of an oil separator according to a fifth embodiment and flow of air on the introduction side.
Figure 12:
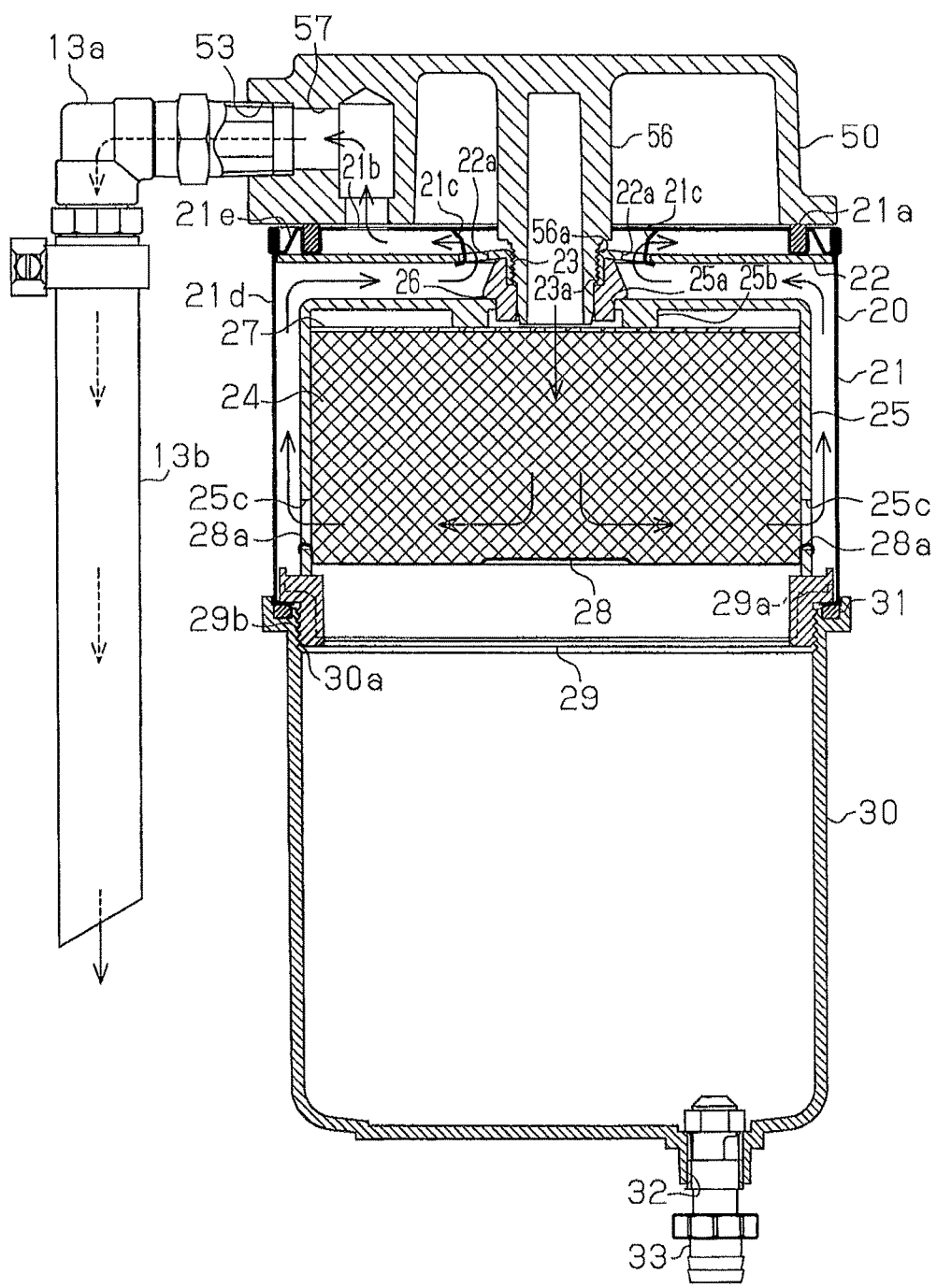
FIG. 12 is a cross-sectional view illustrating the structure of the oil separator of FIG. 11 and flow of air on the discharge side.

As shown in FIGS. 11 and 12, a body 50 has a first port 52, which is an inlet for introducing compressed air from an air dryer, and a second port 53, which is an outlet for discharging air. An introduction-side coupling member 12*a* is threaded to the first port 52. An introduction hose 12*b* connected to the air dryer is assembled to the introduction-side coupling member 12*a*. A discharge-side coupling member 13*a* is threaded to the second port 53. A discharge hose 13*b* is assembled to the discharge-side coupling member 13*a*.

The body 50 has a first central passage portion 56, which allows air to pass through, at the radially central part. The first central passage portion 56 projects downward from the body 50. The body 50 has a first communication passage 54, which connects the first port 52 and the first central passage portion 56 with each other. A first thread portion 56*a*, which is an external thread, is formed in the first central passage portion 56. The body 50 has a second communication passage 57, which connects the second port 53 and the filter cartridge 20 with each other.

Operation of the above described oil separator will now be described with reference to FIGS. 11 and 12.

Passage of air on the introduction side will first be described with reference to FIG. 11. Purge air discharged from the air dryer is introduced to the first port 52 of the oil separator. The purge air contains oil and water. The purge air introduced from the first port 52 passes through the first communication passage 54, passes the first central passage portion 56 from the top to the bottom, and enters the filter accommodating member 25.

The air that has entered the filter accommodating member 25 strikes the filter 24 after striking the punched metal sheet 27, so that oil and water contained in the air are separated from the air. Liquid containing water and oil trapped by the punched metal sheet 27 and the filter 24 flows along the filter 24 and drops downward through the clearance between the filter supporting plate 28 and the filter accommodating member 25. The liquid is thus stored in the drain bowl 30.

Passage of air on the discharge side will be described with reference to FIG. 12. The air that has passed through the filter 24 is introduced to the clearance between the case 21 and the filter accommodating member 25 from the side through holes 25*c* of the filter accommodating member 25. The air that has passed through the through holes 22*a* of the thread member 22 enters the clearance between the thread member 22 and the case 21. The air that has entered the clearance between the thread member 22 and the case 21 passes through the through hole 21*b* of the case 21 and the second communication passage 57, and is discharged to the outside from the second port 53 via the discharge hose 13*b*.

The fifth embodiment has the following advantage in addition to the advantages (1) to (4) of the first embodiment.

(7) The body 50 is molded integrally. Thus, when manufacturing the body 50, no fastening operation using bolts is necessary. This facilitates the manufacturing process.

Sixth Embodiment

An oil separator according to a sixth embodiment will now be described with reference to FIGS. 13 and 14. The oil separator of the sixth embodiment is different from that of the fifth embodiment in that air flows in a direction opposite to that of the fifth embodiment. Differences from the fifth embodiment will mainly be discussed below. The filter cartridge 20 and the drain bowl 30 of the oil separator of the sixth embodiment have substantially the same configuration as that of the oil separator of the first embodiment.

Figure 13:
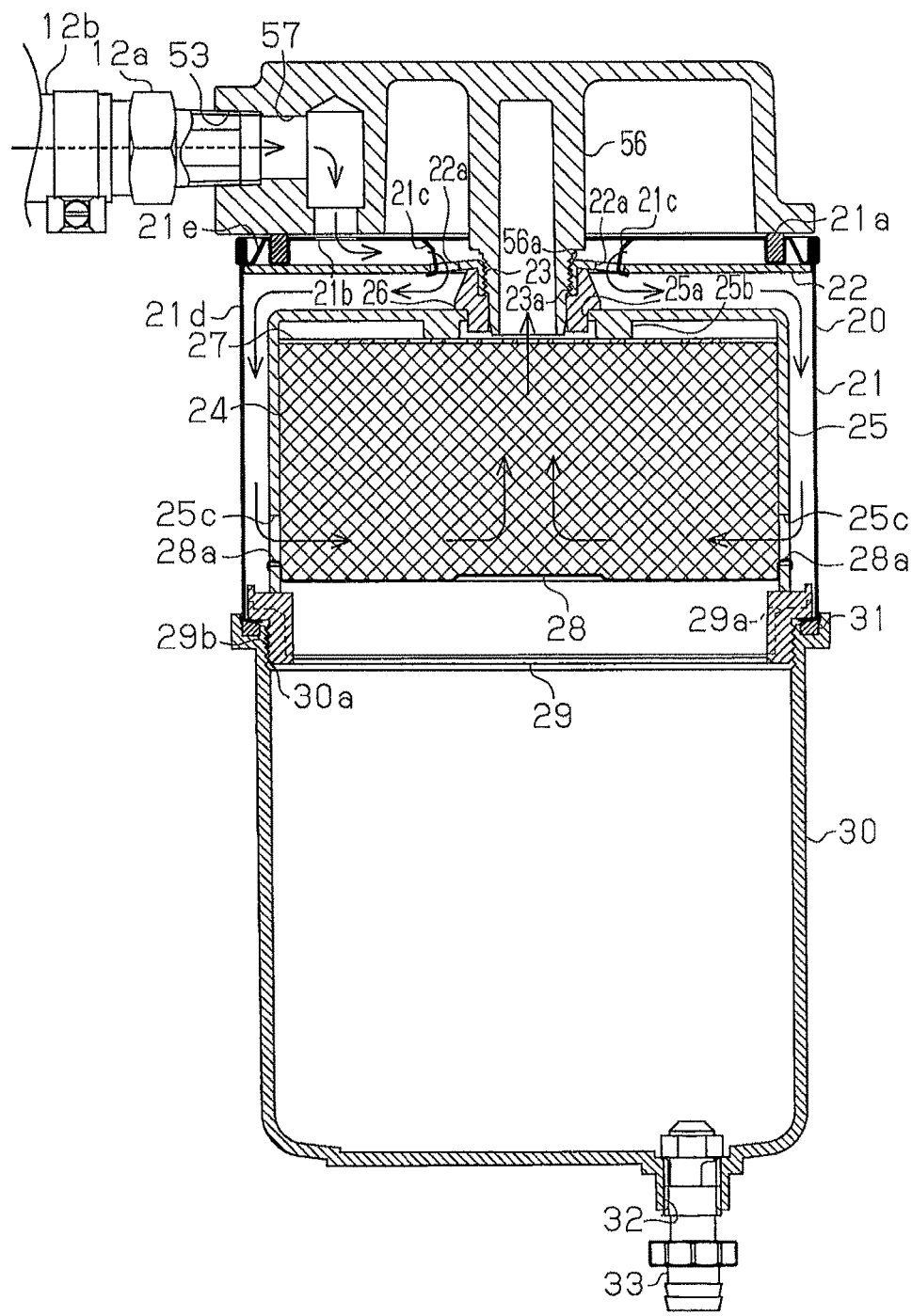
FIG. 13 is a cross-sectional view illustrating the structure of an oil separator according to a sixth embodiment and flow of air on the introduction side.
Figure 14:
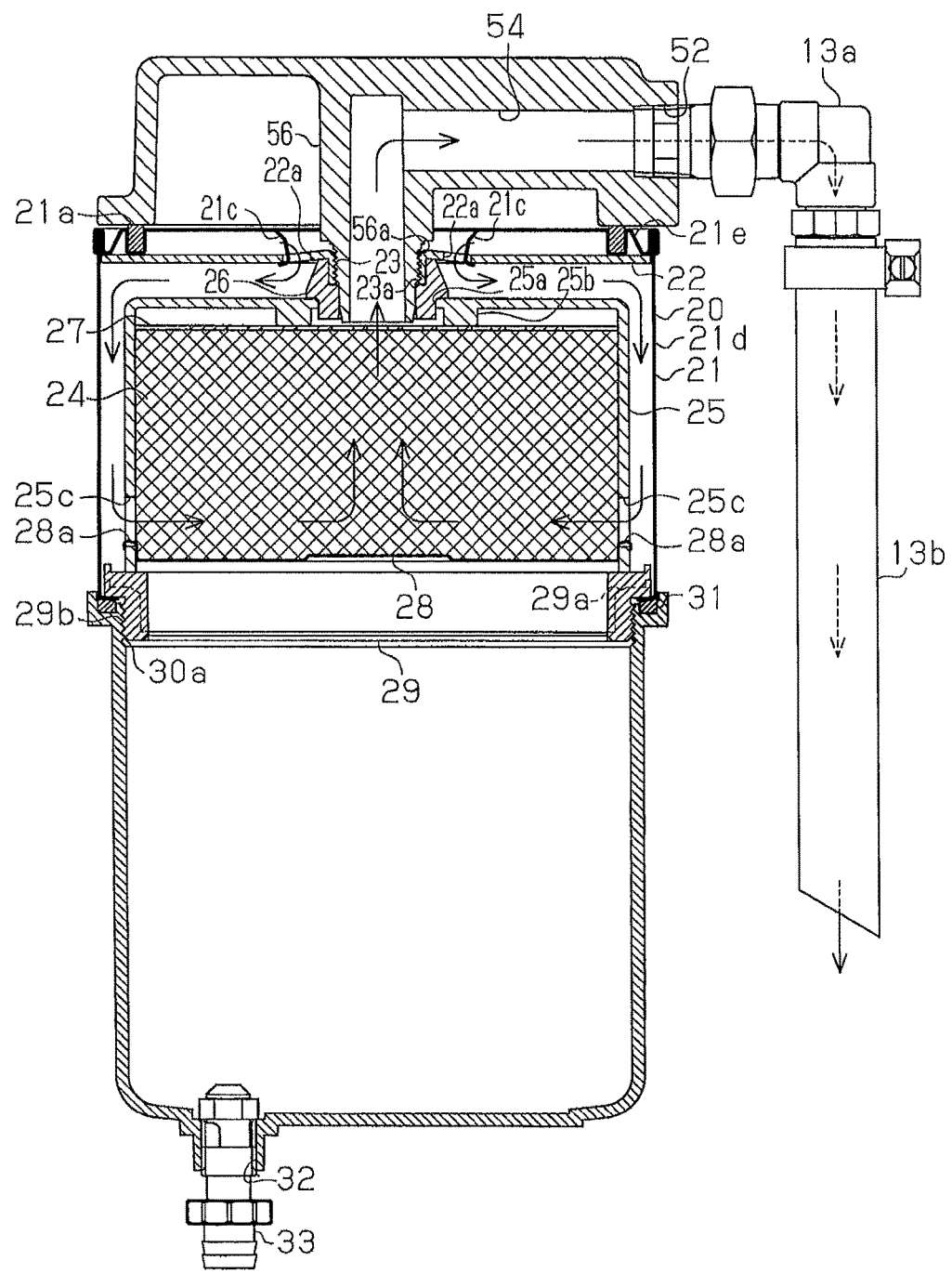
FIG. 14 is a cross-sectional view illustrating the structure of the oil separator of FIG. 13 and flow of air on the discharge side.

As shown in FIGS. 13 and 14, the second port 53 serves as the inlet, and the first port 52 serves as the outlet. The introduction hose 12*b* is connected to the second port 53 via the introduction-side coupling member 12*a*. The discharge hose 13*b* is connected to the first port 52 via the discharge-side coupling member 13*a*.

Operation of the above described oil separator will now be described with reference to FIGS. 13 and 14.

Passage of air on the introduction side will first be described with reference to FIG. 13. Purge air discharged from the air dryer is introduced to the second port 53 of the oil separator. The purge air contains oil and water. The purge air introduced from the second port 53 enters the filter cartridge 20 after passing through the second communication passage 57 and the through hole 21*b* of the case 21.

The air that has entered the clearance between the case 21 and the thread member 22 passes through the through holes 22*a* of the thread member 22 and then enters the filter accommodating member 25 from the side through holes 25*c* of the filter accommodating member 25. The air strikes the filter 24 and the punched metal sheet 27, so that oil and water contained in the air are separated from the air. Liquid containing water and oil trapped by the filter 24 and the punched metal sheet 27 flows along the filter 24 and drops downward through the clearance between the filter supporting plate 28 and the filter accommodating member 25. The liquid is thus stored in the drain bowl 30.

Passage of air on the discharge side will be described with reference to FIG. 14. After passing through the filter 24, the air passes through the first central passage portion 56 from the bottom to the top and the first communication passage 54 and is discharged to the outside from the first port 52 via the discharge hose 13b.

The sixth embodiment has the advantages (1) to (4) of the first embodiment and the advantage (7) of the fifth embodiment.

Seventh Embodiment

Figure 15:
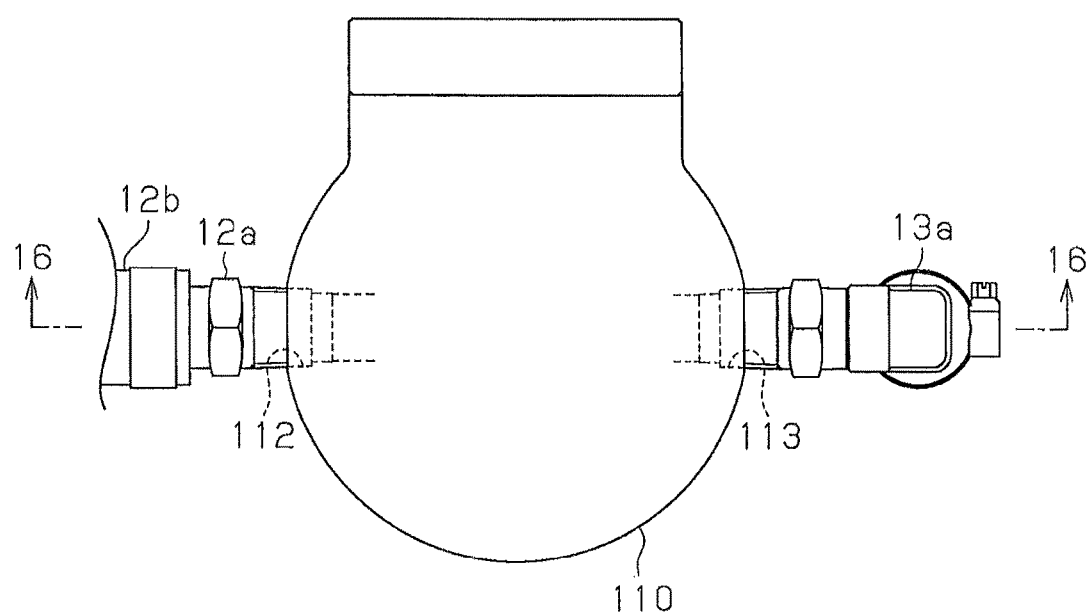
FIG. 15 is a top view of an oil separator according to a seventh embodiment.
Figure 16:
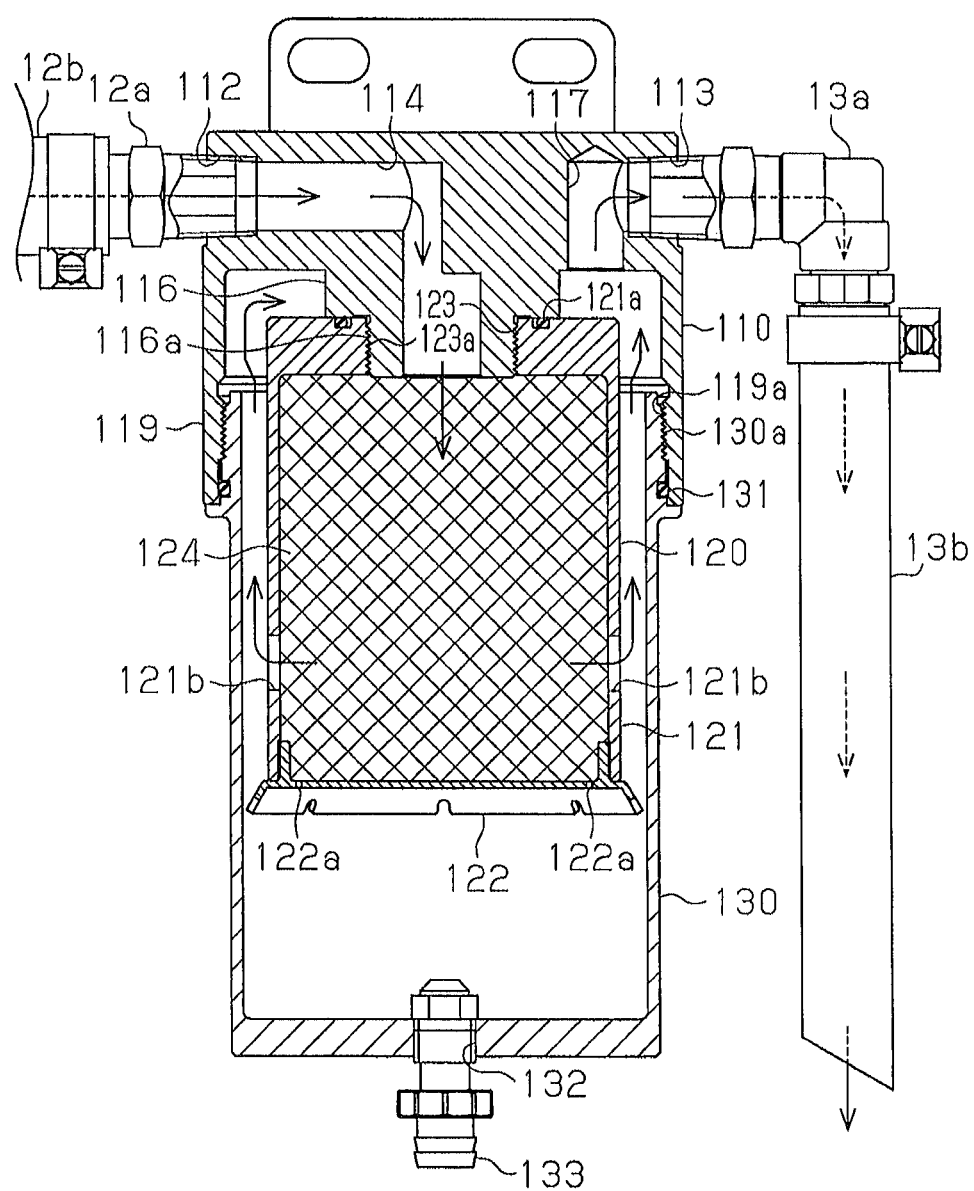
FIG. 16 is a cross-sectional view taken along line 16-16 of FIG. 15, illustrating the structure of the oil separator and flow of air.
Figure 17:
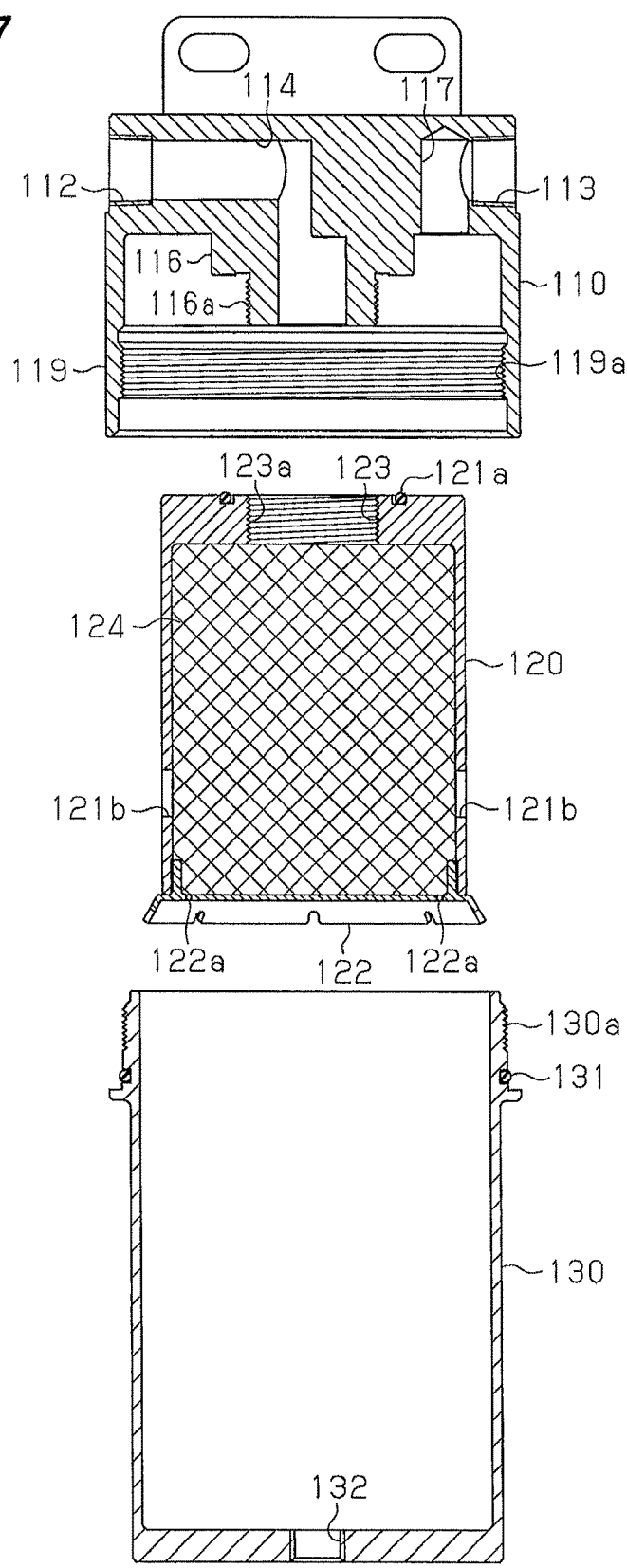
FIG. 17 is an exploded cross-sectional view of the oil separator of FIG. 16.

An oil separator according to a seventh embodiment will now be described with reference to FIGS. 15 to 17. The oil separator of the seventh embodiment is different from that of the first embodiment in that a filter cartridge and a drain bowl are assembled to a body. Differences from the first embodiment will mainly be discussed below. FIG. 16 is a cross-sectional view taken along line 16-16 of FIG. 15, illustrating a body 110, a filter cartridge 120, and a drain bowl 130. The other components are shown as viewed from the side.

As shown in FIG. 16, the oil separator has a vertically extending cylindrical housing. The oil separator includes the body 110, the filter cartridge 120, which is assembled to the bottom of the body 110, and the drain bowl 130, which is assembled to the bottom of the body 110. The body 110 has a first port 112, which is an inlet for introducing compressed air from an air dryer, and a second port 113, which is an outlet for discharging air. An introduction-side coupling member 12a is threaded to the first port 112. An introduction hose 12b connected to the air dryer is assembled to the introduction-side coupling member 12a. A discharge-side coupling member 13a is threaded to the second port 113. A discharge hose 13b is assembled to the discharge-side coupling member 13a. The filter cartridge 120 accommodates a filter 124, which is made of sponge (urethane foam). The drain bowl 30 stores oil separated from air. The filter 124 functions as an impingement member.

The body 110 has a first central passage portion 116, which allows air to pass through, at the radially central part. The first central passage portion 116 projects downward from the body 110. A downwardly projecting cylindrical portion 119 is provided at the outer periphery of the body 110. A fifth thread portion 119a, which is an internal thread, is formed in the inner wall of the cylindrical portion 119. The body 110 has a first communication passage 114, which connects the first port 112 and the first central passage portion 116 with each other. A first thread portion 116a, which is an external thread, is formed in the first central passage portion 116. The body 110 has a second communication passage 117, which connects the second port 113 and the filter cartridge 120 with each other.

The filter cartridge 20 includes a cylindrical case 121, which has a lower opening and a closed upper end, and a lid member 122, which closes the lower opening of the case 121. The case 121 accommodates the filter 124. The lid member 122 has through holes 122a. An annular second sealing member 121a is provided in an upper part of the case 121. The second sealing member 121a seals between the body 110 and the case 121. The case 121 has a second central passage portion 123, which allows air to pass through, at the radial center in the upper part. A second thread portion 123a, which is an internal thread, is formed in the second central passage portion 123. The second thread portion 123a is threaded to the first thread portion 116a of the first central passage portion 116. The case 121 has side through holes 121b in a lower part of the side.

The drain bowl 130 has a cylindrical shape with an upper opening and a closed lower end. An annular third sealing member 131 is provided in an upper part of the side of the drain bowl 130. The third sealing member 131 seals between the body 110 and the drain bowl 130. A sixth thread portion 130a, which is an internal thread, is formed in the drain bowl 30. The sixth thread portion 130a is threaded to the fifth thread portion 119a of the body 110. The drain bowl 30 has, at a lower part, a drainage hole 132 for draining stored liquid. A connection plug 133, to which a drain hose is connected, is assembled to the drainage hole 132.

The assembling process of the oil separator will now be described with reference to FIG. 17. That is, the assembling process of the body 110, the filter cartridge 120, and the drain bowl 130 will be described.

First, the body 110 and the filter cartridge 120 are assembled by using a spin-on structure, in which the first thread portion 116a formed in the body 110 and the second thread portion 123a formed in the filter cartridge 120 are threaded to each other. The spin-on structure completes the assembling process in one action and corresponds to an assembling structure.

Then, the body 110 and the drain bowl 130 are assembled by using a spin-on structure, in which the fifth thread portion 119a formed in the body 110 and the sixth thread portion 130a formed in the drain bowl 130 are threaded to each other.

When replacing the filter 124, the drain bowl 130 is removed from the body 110, and the filter cartridge 120 is removed from the body 10. Then, the filter cartridge 120 is replaced by a new one. The new filter cartridge 120 is assembled to the body 110, and the drain bowl 130 is assembled to the body 110.

Operation of the above described oil separator will now be described with reference to FIG. 16.

Passage of air on the introduction side will first be described. Purge air discharged from the air dryer is introduced to the first port 112 of the oil separator. The purge air contains oil and water. The purge air introduced from the first port 112 passes through the first communication passage 114 of the body 110, passes the first central passage portion 116 from the top to the bottom, and enters the filter cartridge 120. The air that has entered the filter cartridge 120 strikes the filter 124, so that oil and water contained in the air are separated from the air. Liquid containing water and oil trapped by the filter 124 flows along the filter 124 and drops downward from the through holes 122a of the lid member 122. The liquid is thus stored in the drain bowl 130.

Passage of air on the discharge side will now be described. The air that has passed through the filter 124 is introduced to the clearance between the case 121 and the drain bowl 130 from the side through holes 121b of the filter cartridge 120. The air that has flowed upward through the clearance between the case 121 and the drain bowl 130 passes through the second communication passage 117, and is discharged to the outside from the second port 113 via the discharge hose 13b.

The seventh embodiment has the following advantage in addition to the advantages (1) to (3) of the first embodiment.

(8) The filter cartridge 120 and the drain bowl 130 are assembled by using the spin-on structure, in which the fifth thread portion 119a formed in the body 110 and the sixth thread portion 130a formed in the drain bowl 130 are threaded to each other. Since the drain bowl 130 is threaded to the body 110, the drain bowl 130 is easily attached to or detached from the body 110.

Eighth Embodiment

An oil separator according to an eighth embodiment will now be described with reference to FIG. 18. The oil separator of the eighth embodiment is different from that of the seventh embodiment in that air flows in a direction opposite to that of the seventh embodiment. Differences from the seventh embodiment will mainly be discussed below. The filter cartridge 120 and the drain bowl 130 of the oil separator of the eighth embodiment have the same configuration as that of the oil separator of the seventh embodiment.

Figure 18:
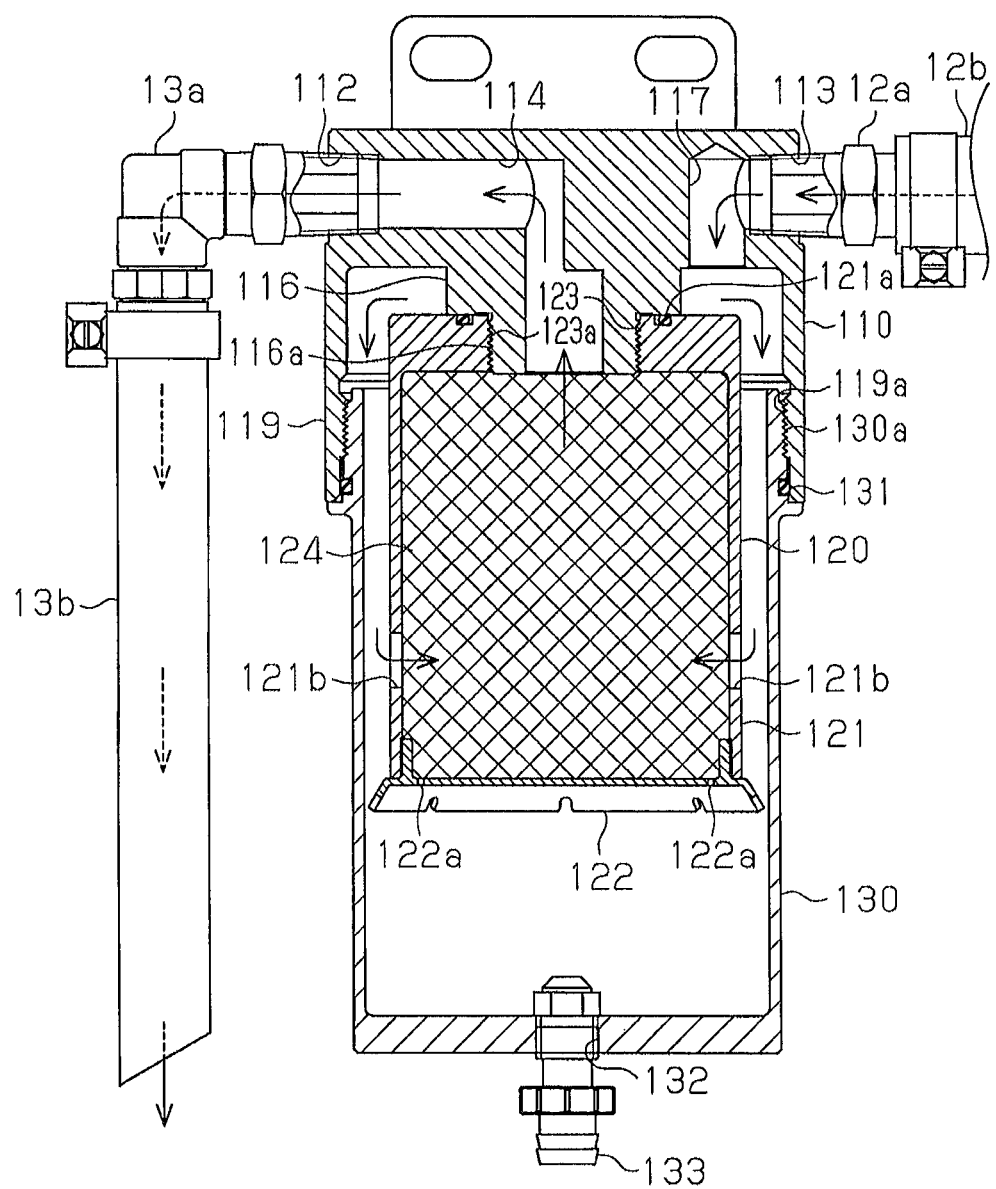
FIG. 18 is a cross-sectional view taken illustrating the structure of an oil separator according to an eighth embodiment and flow of air.

As shown in FIG. 18, the second port 113 serves as the inlet, and the first port 112 serves as the outlet. The introduction hose 12*b* is connected to the second port 113 via the introduction-side coupling member 12*a*. The discharge hose 13*b* is connected to the first port 112 via the discharge-side coupling member 13*a*.

Operation of the above described oil separator will now be described with reference to FIG. 18.

Passage of air on the introduction side will first be described. Purge air discharged from the air dryer is introduced to the second port 113 of the oil separator. The purge air contains oil and water. The purge air introduced through the second port 113 passes through the second communication passage 117 and enters the drain bowl 130, that is, the clearance between the case 121 and the drain bowl 130.

The air that has entered the clearance between the case 121 and the drain bowl 130 enters the filter cartridge 120 through the side through holes 121*b* of the case 121. The air then strikes the filter 124, so that oil and water contained in the air are separated from the air. Liquid containing water and oil trapped by the filter 124 flows along the filter 124 and drops downward from the through holes 122*a* of the lid member 122. The liquid is thus stored in the drain bowl 130.

Passage of air on the discharge side will now be described. After passing through the filter 124, the air passes through the first central passage portion 116 from the bottom to the top and the first communication passage 114 and is discharged to the outside from the first port 112 via the discharge hose 13*b*.

The eighth embodiment has the advantages (1) to (3) of the first embodiment and the advantage (8) of the seventh embodiment.

The above described embodiments may be modified as follows.

In the first to sixth embodiments, the first ports 12, 42, 52 and the second ports 13, 43, 53 are open in the same direction. However, the first ports 12, 42, 52 and the second ports 13, 43, 53 may be open in different directions. For example, the first ports 12, 42, 52 and the second ports 13, 43, 53 may be located at opposite ends and open in opposite directions.

The first to sixth embodiments have structures in which liquid containing water and oil trapped by the filter 24 and the punched metal sheet 27 drops into the drain bowl 30 through the clearance between the filter supporting plate 28 and the filter accommodating member 25. However, a liquid passage hole may be formed in the filter supporting plate 28, so that liquid containing water and oil trapped by the filter 24 and the punched metal sheet 27 directly drops into the drain bowl 30 from the filter supporting plate 28.

In the first to sixth embodiments, the filter cartridge 20 has the third thread portion 29*b*, which is an external thread, and the drain bowl 30 has the fourth thread portion 30*a*, which is an internal thread. However, the third thread portion 29*b* of the filter cartridge 20 may be an internal thread, and the fourth thread portion 30*a* of the drain bowl 30 may be an external thread.

In the first to sixth embodiments, the filter cartridge 20 and the drain bowl 30 have the spin-on structure. However, the filter cartridge 20 and the drain bowl 30 may have other assembling structure. For example, any of the following structures may be used: an engagement structure, in which engaging hooks are engaged with engagement portions; a one-touch coupler structure, in which an insertion portion is attached to an attachment portion; and a band fastener structure, in which connection portions are brought into contact with each other and a band is fixed to the contacting parts. The engagement structure completes the assembling process in one action, which is engagement of the engaging hooks with the engagement portions. The one-touch coupler structure completes the assembling process in one action, which is insertion of the insertion portion into the attachment portion. The band fastener structure completes the assembling process in two actions, which are bringing the connection portions into contact with each other and fixing the band to the contacting parts.

In the first to sixth embodiments, the bodies 10, 40, 50 have the first thread portions 19*a*, 46*a*, 56*a*, which are external threads, and the filter cartridge 20 has the second thread portion 23*a*, which is an internal thread. However, the first thread portions 19*a*, 46*a*, 56*a* of the bodies 10, 40, 50 may be internal threads, and the second thread portion 23*a* of the filter cartridge 20 may be an external thread.

In the first to sixth embodiments, a spin-on structure is provided in the radially central part of the bodies 10, 40, 50 and the filter cartridge 20. However, a spin-on structure may be provided in the peripheral part of the bodies 10, 40, 50 and the filter cartridge 20.

The first to sixth embodiments use the spin-on structure, in which the bodies 10, 40, 50 have the first thread portions 19*a*, 46*a*, 56*a*, and the filter cartridge 20 has the second thread portion 23*a*. However, the bodies 10, 40, 50 and the drain bowl 30 may have other assembling structure. For example, any of the following structures may be used as the assembling structure: an engagement structure, in which engaging hooks are engaged with engagement portions; a one-touch coupler structure, in which an insertion portion is attached to an attachment portion; and a band fastener structure, in which the openings are brought into contact with each other and a band is fixed to the contacting parts. The engagement structure completes the assembling process in one action, which is engagement of the engaging hooks with the engagement portions. The one-touch coupler structure completes the assembling process in one action, which is insertion of the insertion portion into the attachment portion. The band fastener structure completes the assembling process in two actions, which are bringing the connection portions into contact with each other and fixing the band to the contacting parts.

Figure 19:
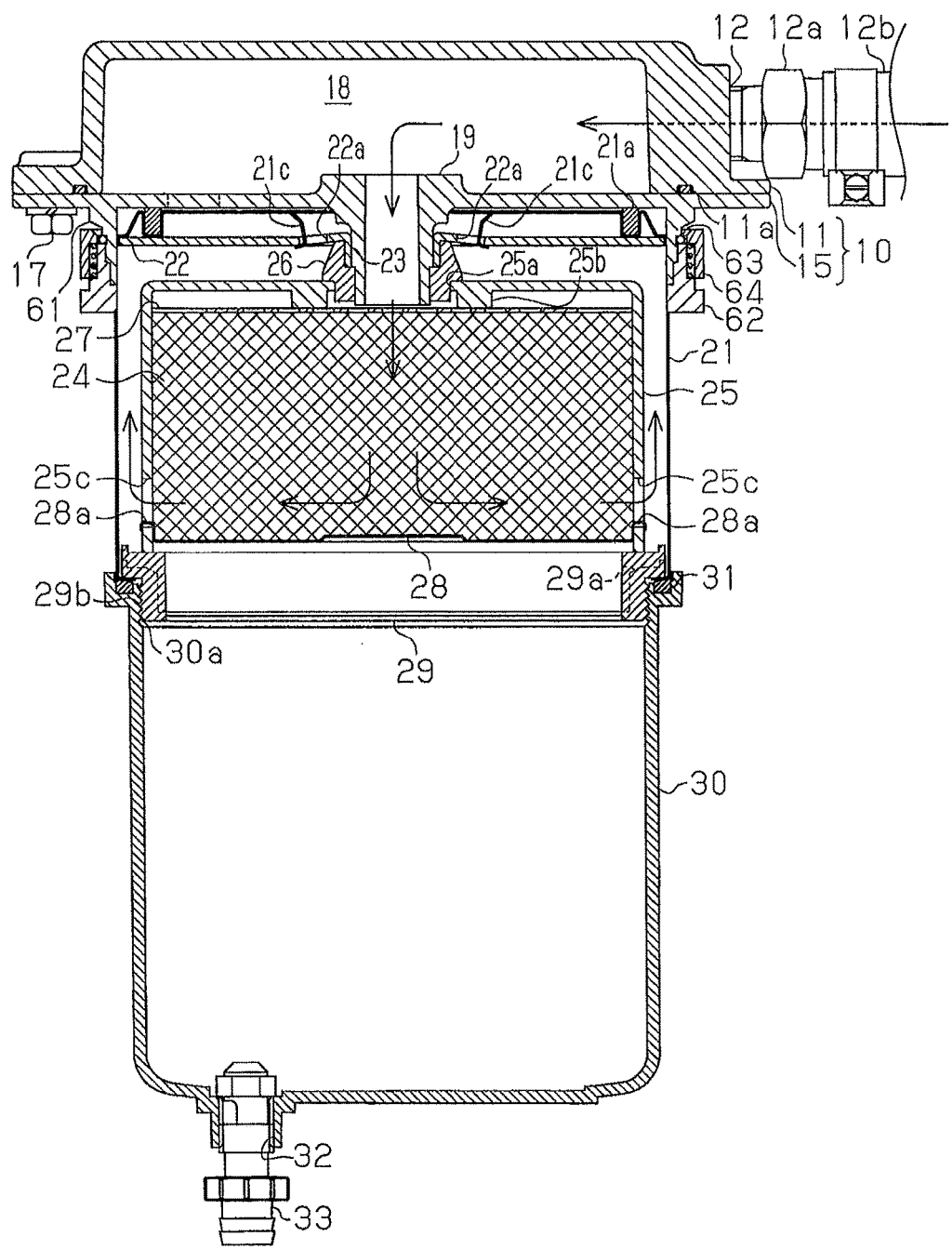
FIG. 19 is a cross-sectional view illustrating the structure of an oil separator according to a modification.

As shown in FIG. 19, the spin-on structure, which includes the first thread portion 19*a* of the body 10 and the second thread portion 23*a* of the filter cartridge 20, may be replaced by a one-touch coupler structure. The one-touch coupler structure includes an attachment portion 62 provided in the upper peripheral part of the filter cartridge 20 and an insertion portion 61, which is provided on the lower surface of the body 10 to be inserted into the attachment portion 62. The attachment portion 62 includes balls 63 and an annular manipulation portion 64, which restricts radially outward movement of the balls 63 and is manipulated when the insertion portion 61 is attached or detached. When attaching or detaching the insertion portion 61, the manipulation portion 64 is displaced downward, so that the balls 63 are no longer restricted from moving radially outward. This allows the insertion portion 61 to be attached to or detached from the attachment portion 62.

Figure 20:
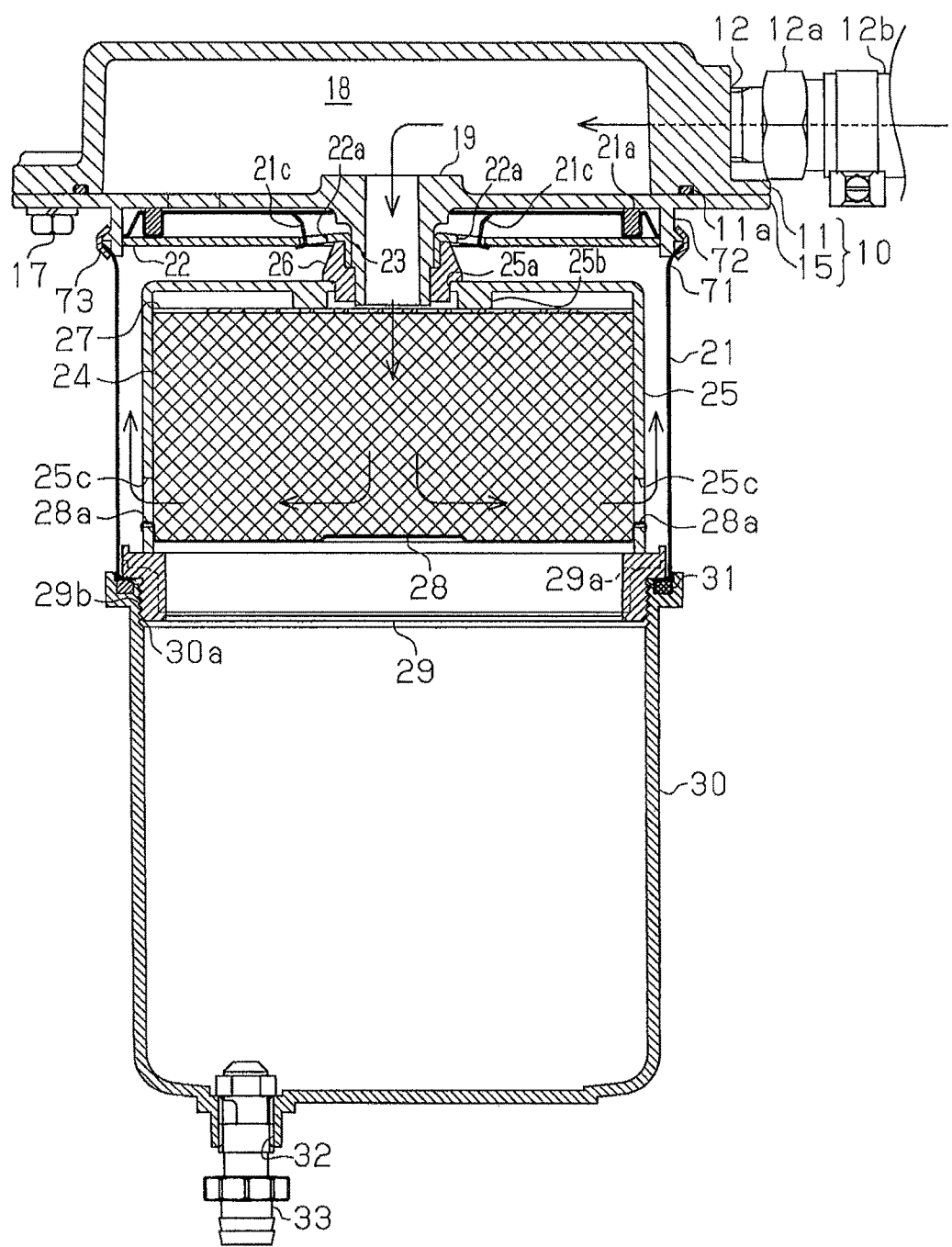
FIG. 20 is a cross-sectional view illustrating the structure of an oil separator according to another modification.

As shown in FIG. 20, the spin-on structure, which includes the first thread portion 19*a* of the body 10 and the second thread portion 23*a* of the filter cartridge 20, may be replaced by a band faster structure. The band fastener structure includes a connecting portion 72, which is provided in the outer edge of the upper part of the filter cartridge 20, a connecting portion 71, which contacts the connecting portion 72, and a band 73, which fixes the contacting parts of the connecting portions 71, 72. When attaching the insertion portion 61, the connecting portion 71 of the body 10 and the connecting portion 72 of the filter cartridge 20 are brought into contact with each other, and the contacting parts are covered with the band 73, which is fixed to the contacting parts. When detaching the insertion portion 61, the band 73 is removed from the contacting parts, and the connecting portion 71 of the body 10 and the connecting portion 72 of the filter cartridge 20 are separated from each other.

In the seventh and eighth embodiments, the body 110 has the fifth thread portion 119a, which is an internal thread, and the drain bowl 130 has the sixth thread portion 130a, which is an external thread. However, the fifth thread portion 119a of the body 110 may be an internal thread, and the sixth thread portion 130a of the drain bowl 130 may be an external thread.

In the seventh and eighth embodiments, the filter cartridge 120 and the drain bowl 130 have a spin-on structure. However, the filter cartridge 120 and the drain bowl 130 may have other assembling structure. For example, any of the following structures may be used: an engagement structure, in which engaging hooks are engaged with engagement portions; a one-touch coupler structure, in which an insertion portion is attached to an attachment portion; and a band fastener structure, in which connection portions are brought into contact with each other and a band is fixed to the contacting parts. The engagement structure completes the assembling process in one action, which is engagement of the engaging hooks with the engagement portions. The one-touch coupler structure completes the assembling process in one action, which is insertion of the insertion portion into the attachment portion. The band fastener structure completes the assembling process in two actions, which are bringing the connection portions into contact with each other and fixing the contacting parts with the band.

In the seventh and eighth embodiments, the body 110 has the first thread portion 116a, which is an external thread, and the filter cartridge 120 has the second thread portion 123a, which is an internal thread. However, the first thread portion 116a of the body 110 may be an internal thread, and the second thread portion 123a of the filter cartridge 120 may be an external thread.

The seventh and eighth embodiments use a spin-on structure, in which the body 110 has the first thread portion 116a, and the filter cartridge 120 has the second thread portion 123a. However, the body 110 and the filter cartridge 120 may have other assembling structure. For example, any of the following structures may be used as the assembling structure: an engagement structure, in which engaging hooks are engaged with engagement portions; a one-touch coupler structure, in which an insertion portion is attached to an attachment portion; and a band fastener structure, in which the openings are brought into contact with each other and a band is fixed to the contacting parts. The engagement structure completes the assembling process in one action, which is engagement of the engaging hooks with the engagement portions. The one-touch coupler structure completes the assembling process in one action, which is insertion of the insertion portion into the attachment portion. The band fastener structure completes the assembling process in two actions, which are bringing the connection portions into contact with each other and fixing the band to the contacting parts.

In the above illustrated embodiments, the bodies 10, 40, 50, 110 have a route through which air flows in the radially central part. However, a route through which air flows may be provided at any position other than the radially central part.

In the first to sixth embodiments, the filter supporting plate 28 is secured to the filter accommodating member 25 to accommodate the filter 24. However, the filter 24 itself may be secured to the filter accommodating member 25. Alternatively, the filter 24 may be accommodated in the filter accommodating member 25 by using other structure.

In above illustrated embodiments, sponge (urethane foam) is employed as the filters 24, 124, but other material such as crushed aluminum or unwoven fabric may be employed as an impingement member.

DESCRIPTION OF THE REFERENCE NUMERALS

10 . . . Body, 11 . . . Connecting Member, 11a . . . First Sealing Member, 11b . . . Second Sealing Member, 12 . . . First Port, 12a . . . Introduction-Side Coupling Member, 12b . . . Introduction Hose, 13 . . . Second Port, 13a . . . Discharge-Side Coupling Member, 13b . . . Discharge Hose, 14 . . . Communication Passage, 15 . . . Lid Member, 15a . . . Through Hole, 17 . . . Bolts, 18 . . . First Expansion Chamber, 19 . . . First Central Passage Portion, 19a . . . First Thread Portion; 20 . . . Filter Cartridge, 21 . . . Case, 21a . . . Third Sealing Member, 21b . . . Through Hole, 21c . . . Engaging Pieces, 21d . . . Side Surface Portion, 21e . . . Top Surface Portion, 22 . . . Thread Member, 22a . . . Through Hole, 23 . . . Second Central Passage Portion, 23a . . . Second Thread Portion, 24 . . . Filter, 25 . . . Filter Accommodating Member, 25a . . . Central Through Hole, 25b . . . Protrusion, 25c . . . Side Through Holes, 26 . . . Fourth Sealing Member, 27 . . . Punched Metal Sheet, 28 . . . Filter Supporting Plate, 28a . . . Engaging Pieces, 29 . . . Filter Supporting Member, 29a . . . Groove, 29b . . . Third Thread Portion, 30 . . . The Drain Bowl, 30a . . . Fourth Thread Portion, 31 . . . Fifth Sealing Member, 32 . . . Drainage Hole, 33 . . . Connection Plug, 40 . . . Body, 41 . . . Connecting Member, 41a . . . First Sealing Member, 42 . . . First Port, 43 . . . Second Port, 44 . . . Communication Passage, 45 . . . Lid Member, 45a . . . Through Hole, 46 . . . First Central Passage Portion, 46a . . . First Thread Portion, 47 . . . Bolts, 48 . . . First Expansion Chamber, 50 . . . Body, 52 . . . First Port, 53 . . . Second Port, 54 . . . First Communication Passage, 56 . . . First Central Passage Portion, 56a . . . First Thread Portion, 57 . . . Second Communication Passage, 61 . . . Insertion Portion, 62 . . . Attachment Portion, 63 . . . Balls, 64 . . . Manipulation Portion, 71 . . . Connecting Portion, 72 . . . Connecting Portion, 73 . . . Band, 110 . . . Body, 112 . . . First Port, 113 . . . Second Port, 114 . . . Communication Passage, 116 . . . First Central Passage Portion, 116a . . . First Thread Portion, 117 . . . Second Communication Passage, 119 . . . Cylindrical Portion, 119a . . . Fifth Thread Portion, 120 . . . Filter Cartridge, 121 . . . Case, 121a . . . Second Sealing Member, 121b . . . Side Through Holes, 122 . . . Lid Member, 122a . . . Through Hole, 123 . . . Second Central Passage Portion, 123a . . . Second Thread Portion, 124 . . . Filter, 130 . . . Drain Bowl, 130a . . . Sixth Thread Portion, 131 . . . Third Sealing Member, 132 . . . Drainage Hole, 133 . . . Connection Plug

The invention claimed is:

1. An oil separator that causes air containing oil to strike an impingement member to separate the oil from the air and recover the oil, the oil separator comprising:
a body having an inlet for introducing air and an outlet for discharging air;
a cartridge assembled to the body, accommodates the impingement member, and comprising a vertically-extending wall portion;
a drain bowl for storing the separated oil;
a first assembling structure;
a second assembling structure;
wherein the body and the cartridge are assembled through one or two actions by using the first assembling structure, and
wherein the body and the drain bowl are assembled by using the second assembling structure,
a fifth thread portion is formed in the body;
a sixth thread portion is formed in the drain bowl; and
wherein the second assembling structure is a spin-on structure in which the fifth thread portion and the sixth thread portion are threaded to each other, and
a through hole is formed at the vertically-extending wall portion of the cartridge;
wherein the introduced air enters the cartridge through the through hole formed at the vertically-extending wall portion of the cartridge and strikes the impingement member, so that oil is separated from the introduced air and cleaned air, from which the oil has been separated, is discharged.

2. The oil separator according to claim 1, further comprising:
a first thread portion is formed in the body; and
a second thread portion is formed in the cartridge,
wherein the first assembling structure is a spin-on structure in which the first thread portion and the second thread portion are threaded to each other.

3. The oil separator according to claim 2, further comprising:
a first central passage portion, which allows air to pass through and is provided in a radially central part of the body; and
wherein the first thread portion is formed in the first central passage portion,
a second central passage portion, which allows the cleaned air, from which the oil has been separated, to pass through and is provided in a radially central part of the cartridge,
wherein the second thread portion is formed in the second central passage portion.

4. The oil separator according to claim 2, wherein the body includes
a connecting member that has a lower opening, the inlet, and the outlet, and
a lid member that closes the opening of the connecting member and has the first thread portion.

5. The oil separator according to claim 1, further comprising:
an insertion portion provided in one of the body and the cartridge; and
an attachment portion provided in the other one of the body and the cartridge,
wherein the first assembling structure is a one-touch coupler structure, in which the insertion portion is attached to the attachment portion, and
wherein, when the insertion portion is attached to the attachment portion, the insertion portion is restricted from being removed from the attachment portion.

6. The oil separator according to claim 1, wherein the body has an opening,
wherein the cartridge has an opening,
wherein the first assembling structure is a band fastener structure in which the opening of the body is brought into contact with the opening of the cartridge, and
wherein the body and the cartridge are fixed to each other with a band at contacting parts.

7. The oil separator according to claim 1, wherein the body has an expansion chamber for expanding air.

8. An oil separator that causes air containing oil to strike an impingement member to separate the oil from the air and recover the oil, the oil separator comprising:
a body having an inlet for introducing air and an outlet for discharging air;
a cartridge that is assembled to the body and accommodates the impingement member;
a drain bowl for storing the separated oil;
a first assembling structure;
a second assembling structure;
wherein the body and the cartridge are assembled through one or two actions by using the first assembling structure, and
wherein the body and the drain bowl are assembled by using the second assembling structure,
a fifth thread portion is formed in the body;
a sixth thread portion is formed in the drain bowl;
wherein the second assembling structure is a spin-on structure in which the fifth thread portion and the sixth thread portion are threaded to each other, and
a through hole is formed in the cartridge;
wherein the introduced air enters the cartridge through the through hole and strikes the impingement member, so that oil is separated from the introduced air,
a first thread portion is formed in the body; and
a second thread portion is formed in the cartridge,
wherein the first assembling structure is a spin-on structure in which the first thread portion and the second thread portion are threaded to each other,
wherein the first thread portion is an external thread, and
wherein the second thread portion is an internal thread.

* * * * *